United States Patent
Pattabiraman et al.

(10) Patent No.: US 11,651,333 B2
(45) Date of Patent: May 16, 2023

(54) SPECIALIZED USER INTERFACES AND PROCESSES FOR INCREASING USER INTERACTIONS WITH JOB POSTINGS IN A SOCIAL NETWORK/TOP JOBS

(71) Applicant: Microsoft Technology Licensing, LLC, Redmond, WA (US)

(72) Inventors: Kumaresh Pattabiraman, Sunnyvale, CA (US); Kevin Chuang, San Francisco, CA (US); Dezhen Li, Mountain View, CA (US); Kevin Kao, San Jose, CA (US); Parul Jain, Cupertino, CA (US); Caleb Timothy Johnson, Santa Clara, CA (US); Anthony Duane Duerr, Castro Valley, CA (US); Mohammad Aleagha, Redwood City, CA (US); Jeffrey Warren Lee, Cupertino, CA (US); Minhtu Nguyen, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 25 days.

(21) Appl. No.: 15/588,048

(22) Filed: May 5, 2017

(65) Prior Publication Data
US 2018/0322463 A1    Nov. 8, 2018

(51) Int. Cl.
*G06Q 10/1053* (2023.01)
*G06Q 50/00* (2012.01)

(52) U.S. Cl.
CPC ......... *G06Q 10/1053* (2013.01); *G06Q 50/01* (2013.01)

(58) Field of Classification Search
CPC ....... G06Q 10/1053; G06Q 10/063112; G06Q 10/06; G06Q 10/105; G06Q 50/01
See application file for complete search history.

(56) References Cited

U.S. PATENT DOCUMENTS 6,370,513 B1 * 4/2002 Kolawa ............... G06Q 30/02
705/7.33
8,090,621 B1 * 1/2012 Chakrabarti ....... G06Q 30/0601
705/26.1

(Continued)

FOREIGN PATENT DOCUMENTS

CN         102236716 A      11/2011

OTHER PUBLICATIONS

D. H. Lee and P. Brusilovsky, "Fighting Information Overflow with Personalized Comprehensive Information Access: A Proactive Job Recommender," Third International Conference on Autonomic and Autonomous Systems (ICAS'07), 2007, pp. 21-21, doi: 10.1109/CONIELECOMP.2007.76 (Year: 2007).*

(Continued)

*Primary Examiner* — Gabrielle A McCormick
*Assistant Examiner* — Maame Ofori-Awuah
(74) *Attorney, Agent, or Firm* — Schwegman, Lundberg & Woessner, P.A.

(57) ABSTRACT

Techniques for enhancing usability and electronic resource efficiency using job relevance are disclosed herein. In some embodiments, a list of a predetermined number of top job openings for a member of the social networking system is generated. The list is communicated to a device of the user for presentation in a user interface on the device. The user interface allows the member to browse through and provide an indication of a lack of relevancy of each of the list of the predetermined number of top job openings to the member and an indication of a reason for the lack of relevancy. Based on the user providing the indication of the lack of relevancy and the reason, a modified relevancy assessment of each of the plurality of job openings is generated. The list of the predetermined number of top job openings for the member is regenerated and communicated to the device.

20 Claims, 17 Drawing Sheets

(56) References Cited

U.S. PATENT DOCUMENTS

| | | | |
|---|---|---|---|
| 2011/0196801 A1 | 8/2011 | Ellis et al. | |
| 2012/0278341 A1* | 11/2012 | ogilvy | G06F 16/313 |
| | | | 707/749 |
| 2013/0282605 A1* | 10/2013 | Noelting | G06Q 10/1053 |
| | | | 705/321 |
| 2014/0156681 A1 | 6/2014 | Lee et al. | |
| 2014/0207564 A1* | 7/2014 | Dubey | G06Q 30/02 |
| | | | 705/14.43 |
| 2014/0297550 A1 | 10/2014 | Miller et al. | |
| 2014/0297746 A1* | 10/2014 | Cheng | H04L 65/1089 |
| | | | 709/204 |
| 2014/0317105 A1* | 10/2014 | Jain | G06F 16/93 |
| | | | 707/731 |
| 2015/0310392 A1* | 10/2015 | Wu | G06Q 10/1053 |
| | | | 705/321 |
| 2016/0048900 A1* | 2/2016 | Shuman | G06Q 30/0204 |
| | | | 705/7.33 |
| 2016/0098683 A1* | 4/2016 | Angulo | G06Q 10/1053 |
| | | | 705/321 |
| 2016/0212484 A1* | 7/2016 | Kimble | H04N 21/4826 |
| 2016/0239900 A1* | 8/2016 | Kamdar | G06F 16/2457 |
| 2017/0032396 A1 | 2/2017 | Gupta et al. | |
| 2017/0220577 A1* | 8/2017 | Pal | G06F 16/9535 |
| 2018/0182015 A1 | 6/2018 | Su et al. | |
| 2018/0322464 A1 | 11/2018 | Pattabiraman et al. | |

OTHER PUBLICATIONS

N. Golovin and E. Rahm, "Reinforcement learning architecture for Web recommendations," International Conference on Information Technology: Coding and Computing, 2004. Proceedings. ITCC 2004., 2004, pp. 398-402 vol. 1, doi: 10.1109/ITCC.2004.1286487 (Year: 2004).*

Malladi, Hari Krishna, and Saikiran Thunuguntla. "Feedback-based Approach to Introduce Freshness in Recommendations." arXiv preprint arXiv:1604.07521 (2016) (Year: 2016).*

"Applicant Initiated Interview Summary Issued in U.S. Appl. No. 15/588,063", dated Apr. 2, 2019, 3 Pages.

"Final Office Action Issued in U.S. Appl. No. 15/588,063", dated Jul. 3, 2019, 19 Pages.

"Non Final Office Action Issued in U.S. Appl. No. 15/588,063", dated Jan. 8, 2019, 16 Pages.

"Non Final Office Action Issued in U.S. Appl. No. 15/588,063", dated Mar. 9, 2020, 23 Pages.

"First Office Action and Search Report Issued in Chinese Patent Application No. 201810420775.2", dated Aug. 4, 2021, 14 Pages.

"Second Office Action Issued in Chinese Patent Application No. 201810420775.2", dated May 7, 2022, 17 Pages.

"Examiner Decision of Final Refusal Issued in Chinese Patent Application No. 201810420775.2", dated Oct. 26, 2022, 15 Pages.

* cited by examiner

SPECIALIZED USER INTERFACES AND PROCESSES FOR INCREASING USER INTERACTIONS WITH JOB POSTINGS IN A SOCIAL NETWORK/TOP JOBS

TECHNICAL FIELD

The present application relates generally to machine learning and, in one specific example, to methods and systems of adjusting job relevancy data maintained by a social networking system in real time based on input data received from one or more devices of the one or more users via one or more specialized user interfaces.

BACKGROUND

A social-networking system, such as LinkedIn, may have its success or usefulness measured at least in part by its ability to generate interest among its members (e.g., potential job candidates) in listings or postings of available jobs posted on the social networking system. How much interest that is generated among the members may depend on many factors, including, for example, the effectiveness of processes or algorithms for matching the members to the job postings and the quality (e.g., ease of use or distinctiveness) of the user interfaces through which the results of the matching processes are exposed to the members.

BRIEF DESCRIPTION OF THE DRAWINGS

Some embodiments of the present disclosure are illustrated by way of example and not limitation in the figures of the accompanying drawings, in which like reference numbers indicate similar elements.

DETAILED DESCRIPTION

Figure 1:
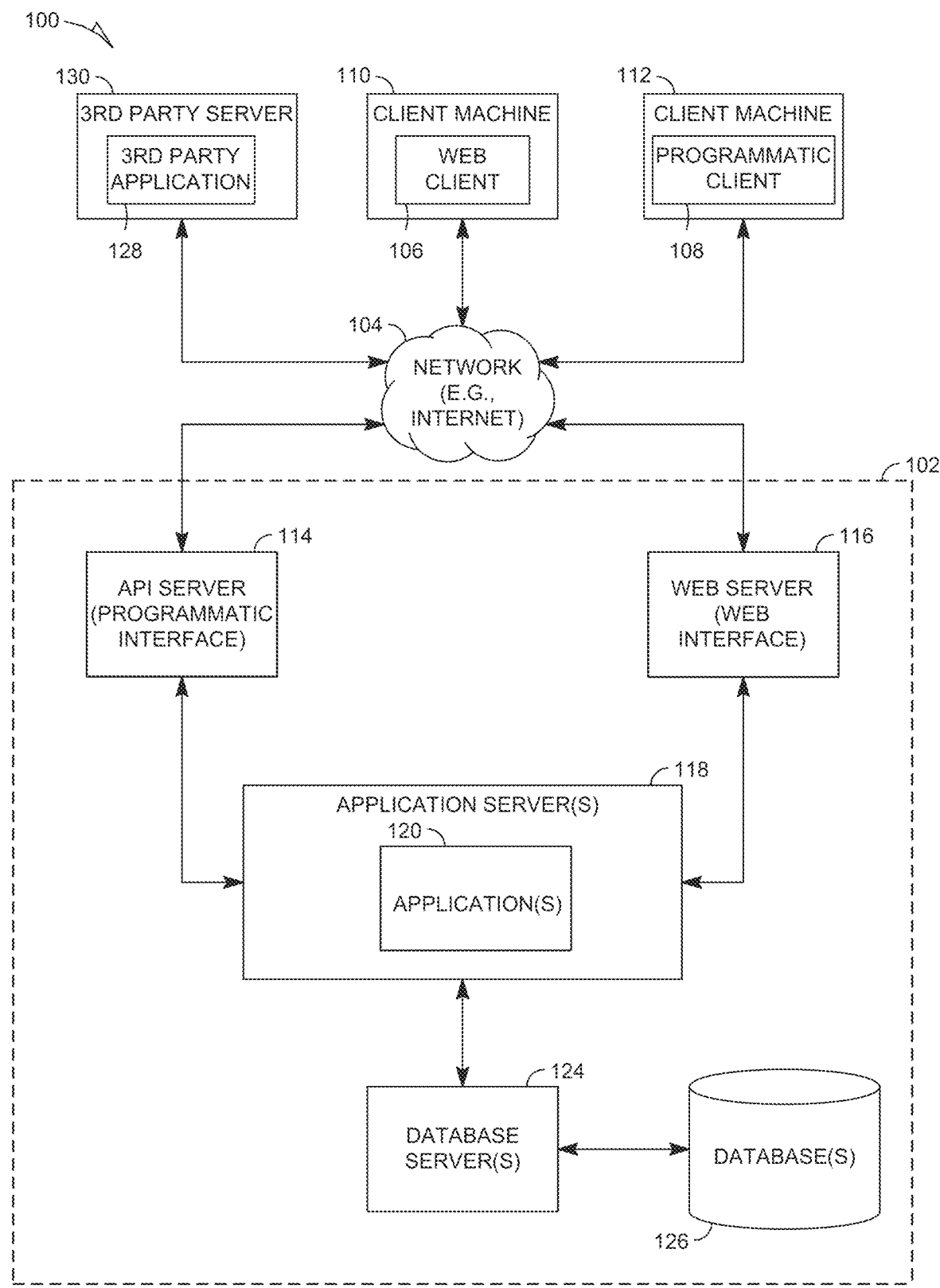
FIG. 1 is a block diagram illustrating a client-server system, in accordance with an example embodiment.

Example methods and systems of enhancing usability and electronic resource efficiency using job relevance are disclosed. In the following description, for purposes of explanation, numerous specific details are set forth in order to provide a thorough understanding of example embodiments. It will be evident, however, to one skilled in the art that the present embodiments may be practiced without these specific details.

In example embodiments, various sub-systems of a social networking system are improved through a Top Jobs back-end system that provides real-time adjusting of job relevance data to, for example, improve job search results and job recommendations, based on real-time feedback received from one or more members of the social-networking system, without the need to perform offline (e.g., overnight) processing, such as Hadoop processing.

In example embodiments, the Top Jobs back-end system receives positive (e.g., "more like this") and negative (e.g., "less like this") signals from front-end systems executing on one or more client devices regarding one or more job postings that have been surfaced to one or more users via one or more user interfaces. The Top Jobs back-end system then provides inputs in real-time to one or more front-end systems, enabling the real-time updating of user interfaces to include feedback received from the one or members pertaining to the relevancy of the job postings.

In example embodiments, the Top Jobs back-end system includes a path (e.g., an application program interface and associated database tables) for providing a baseline of results in various user contexts in which information about available job openings is surfaced to members. Such user contexts may include, for example, a specialized Top Jobs context, in which top jobs are surfaced to members of the social networking system via one or more of specialized user interfaces, as described herein. Such user contexts may also include a job search context, in which job relevancy data collected by the Top Jobs back-end system is used to enhance job posting search results presented via a job search system front-end for searches initiated (e.g., with or without query terms and/or location filters or facets). Such user contexts may also include a job recommendation context, in which job recommendations, or "jobs you may be interested in," presented via a job recommendation system front-end, are enhanced or modified via based on relevancy data collected by the Top Jobs back-end system. Such user context may include a candidate recommendation context, in which "candidates you may be interested in" surfaced to job recruiters via a candidate recommendation front-end system, are enhanced or modified based on relevancy data collected by the Top Jobs back-end system. Such user contexts may include an alerts context, in which members of the social networking system are notified of breaking jobs—e.g., new jobs having particular relevance to the member—as described herein.

In example embodiments, the Top Jobs back-end system includes a "guest" use case or uses browserID/session tracking for leveraging user signals for non-members or members who have not logged into the social networking system.

In example embodiments, a Top Jobs front-end system includes one or more specialized user interfaces for surfacing a predetermined number of job postings that are determined to be most relevant to the user (e.g., based on application of a relevance algorithm) and for collecting feedback from the user with respect to the determined relevancy. The feedback is then transmitted to the Top Jobs back-end system for real-time adjusting of the predetermined number of top job postings. The Top Jobs front-end system then modifies one or more aspects of the specialized user interfaces to immediately reflect the relevancy adjustment.

In example embodiments, a percentage of users of a social networking system may be highly-qualified job seekers who are content with their current employment situation. These users may not be willing to spend much time browsing, researching, or comparing current job postings. Nevertheless, if and when they are presented with compelling information pertaining to a highly relevant job posting, as well as clear options for interacting with the social networking system with respect to the job posting, these users may choose to interact with the social networking system when they otherwise would not have.

In example embodiments, a Breaking Jobs back-end system is configured to analyze a large number of new job postings (e.g., tens of thousands or more per day) and identify users from a large member base (e.g., hundreds of millions of users or more) for which each of the large number of job postings is particularly relevant (e.g., using the Top Jobs back-end system) and also notify those identified users of jobs that are highly relevant to them within a predetermined time period (e.g., 24 hours). In example embodiments, the Breaking Jobs back-end system may integrate offline (e.g., Hadoop) processing of job relevancy data for each user with additional enhanced job relevancy data collected in real time and maintained in an online in-memory data store to enhance the job relevancy data for each user. In example embodiments, the Breaking Jobs back-end system is integrated into a messaging campaign platform that includes logic for centralizing messaging campaigns across multiple back-end systems, including a job recommendation system. Thus, in example embodiments, the messaging campaign platform may determine to replace notifications generated by the Job Recommendation back-end system with notifications generated by the Breaking Jobs back-end system for communication to each user.

In example embodiments, a Breaking Jobs front-end system is configured to generate or communicate one or more user interfaces for presenting notifications pertaining to identified breaking jobs for a user. In example embodiments, the notifications are supplemented with one or more decorations, including insights pertaining to the reasons why the breaking job was identified as being particularly relevant to the user, as well as recommended actions for the user to take (e.g., saving the job or applying for the job featured in the job posting).

In example embodiments, a list of a predetermined number of top job openings for a member of the social networking system is generated. The generating of the list is based on an initial relevancy assessment of each of a plurality of job openings posted on the social networking system with respect to the member. The list is communicated to a device of the user for presentation in a user interface on the device. The user interface allows the member to browse through and provide an indication of a lack of relevancy of each of the list of the predetermined number of top job openings to the member and an indication of a reason for the lack of relevancy. Based on the user providing the indication of the lack of relevancy and the reason, a modified relevancy assessment of each of the plurality of job openings is generated. The generating of the modified relevancy assessment includes modifying weightings associated with one or more attributes of the plurality of job openings based on the indication of the lack of relevancy and the reason. The modified relevancy assessment is adjusted in real time (e.g., without requiring offline processing). The applying of the modified relevancy assessment includes regenerating the list of the predetermined number of top job openings for the member and communicating the regenerated list to the device of the user for presentation in the user interface.

In example embodiments, a plurality of members of the social networking system are identified for which a new job posting is relevant. The identifying includes using an offline batch process to compare at least one of member profile data, behavior data, or social networking data for each of the plurality of members with values of attributes specified within the job posting. The job posting is identified as a top job posting for each of a subset of the plurality of members for which the new job is relevant. The identifying of the job posting as the top job posting includes accessing an online data store that includes enhanced relevancy data. The enhanced relevancy data includes real-time feedback provided by one or more of the plurality of members with respect to relevancy of values of the attributes specified within the job posting. A specialized notification of the top job posting is generated for each of the identified subset of the identified plurality of members. The generating of the specialized notification includes generating one or more decorations to include in the notification. The decorations include one or more visual indicators pertaining to one or more reasons why the job posting was identified as the top job posting for the member. The specialized notification is included in a communication that is scheduled to be sent to the user within a predetermined time frame.

In example embodiments, one or more modules are incorporated into a social networking system, the one or more modules specially-configuring (e.g., through computer programming logic) one or more computer processors of the social networking system to perform one or more of the operations described herein.

FIG. 1 is a block diagram illustrating a client-server system 100, in accordance with an example embodiment. A networked system 102 provides server-side functionality via a network 104 (e.g., the Internet or Wide Area Network (WAN)) to one or more clients. FIG. 1 illustrates, for example, a web client 106 (e.g., a browser) and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more applications 120. The application servers 118 are, in turn, shown to be coupled to one or more database servers 124 that facilitate access to one or more databases 126. While the applications 120 are shown in FIG. 1 to form part of the networked system 102, it will be appreciated that, in alternative embodiments, the applications 120 may form part of a service that is separate and distinct from the networked system 102.

Further, while the system 100 shown in FIG. 1 employs a client-server architecture, the present disclosure is of course not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the applications 120 via the programmatic interface provided by the API server 114.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more functions that are supported by the relevant applications of the networked system 102.

In some embodiments, any website referred to herein may comprise online content that may be rendered on a variety of devices, including but not limited to, a desktop personal computer, a laptop, and a mobile device (e.g., a tablet computer, smartphone, etc.). In this respect, any of these devices may be employed by a user to use the features of the present disclosure. In some embodiments, a user can use a mobile app on a mobile device (any of machines 110, 112, and 130 may be a mobile device) to access and browse online content, such as any of the online content disclosed herein. A mobile server (e.g., API server 114) may communicate with the mobile app and the application server(s) 118 in order to make the features of the present disclosure available on the mobile device. In some embodiments, the networked system 102 may comprise functional components of a social networking service.

Figure 2:
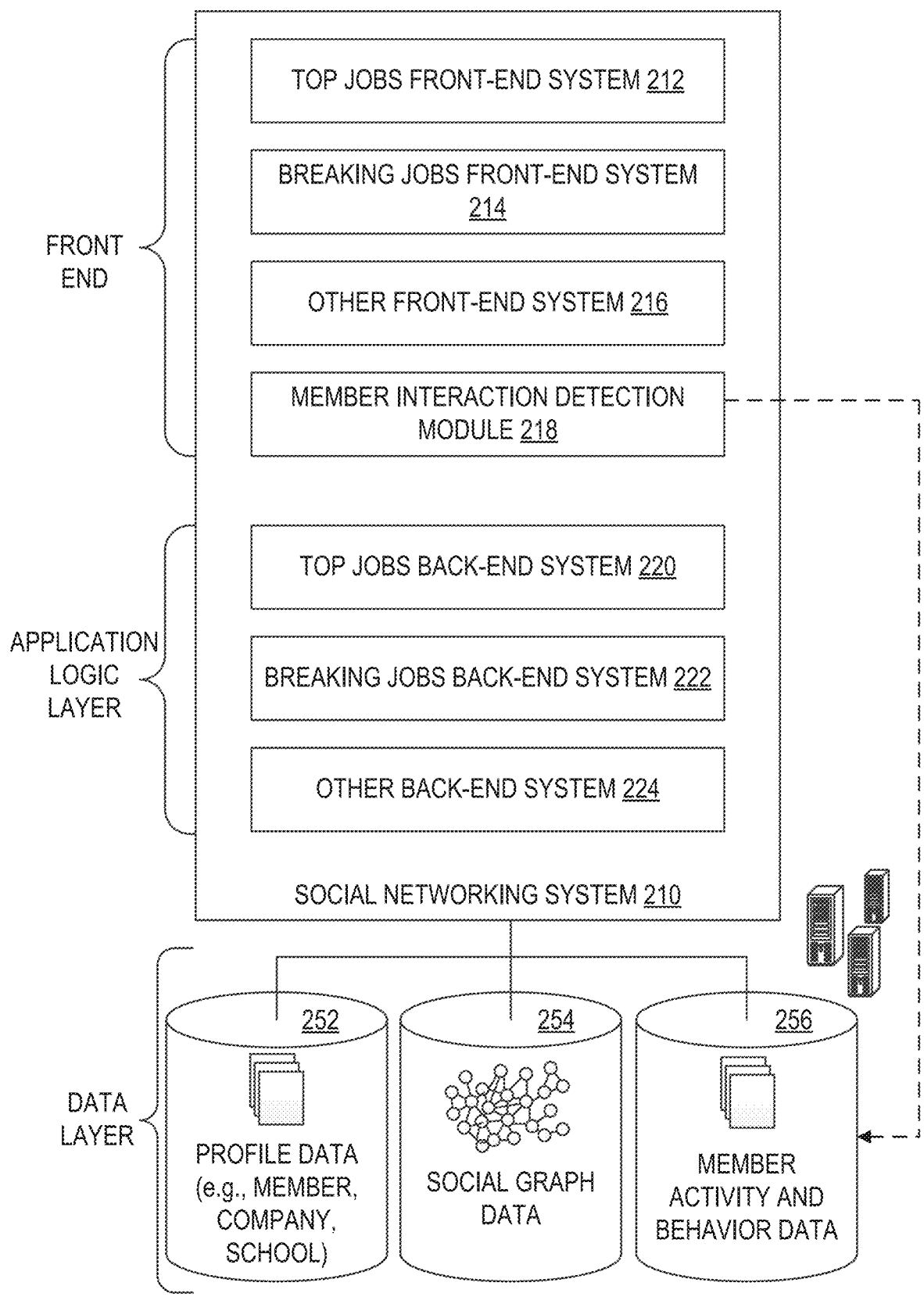
FIG. 2 is a block diagram showing the functional components of a social networking service within a networked system, in accordance with an example embodiment.

FIG. 2 is a block diagram showing the functional components of a social networking system 210, for use in social networking system 210, consistent with some embodiments of the present disclosure. In some embodiments, the functional components reside on application server(s) 118 in FIG. 1. However, it is contemplated that other configurations are also within the scope of the present disclosure.

As shown in FIG. 2, a front-end components, including Top Jobs front-end system 212, Breaking Jobs front-end system 214, and other front-end system 216, may comprise a user interface module (e.g., a web server), which receives requests from various client-computing devices, and communicates appropriate responses to the requesting client devices. For example, the user interface module(s) may receive requests in the form of Hypertext Transfer Protocol (HTTP) requests, or other web-based, application programming interface (API) requests. In addition, a member interaction detection module 218 may be provided to detect various interactions that members have with different applications, services and content presented. As shown in FIG. 2, upon detecting a particular interaction, the member interaction detection module 218 logs the interaction, including the type of interaction and any meta-data relating to the interaction, in a member activity and behavior database 256.

An application logic layer may include one or more various application server modules, which, in conjunction with the user interface module(s), generate various user interfaces (e.g., web pages) with data retrieved from various data sources in the data layer. With some embodiments, application server modules are used to implement the functionality associated with various applications and/or services provided by the social networking service. In some example embodiments, the application logic layer includes the Top Jobs back-end system 220, the Breaking Jobs back-end system 222, and other back-end system 224.

As shown in FIG. 2, a data layer may include several databases, such as a database 252 for storing profile data, including both member profile data and profile data for various organizations (e.g., companies, schools, etc.). Consistent with some embodiments, when a person initially registers to become a member of the social networking service, the person will be prompted to provide some personal information, such as his or her name, age (e.g., birthdate), gender, interests, contact information, home town, address, the names of the member's spouse and/or family members, educational background (e.g., schools, majors, matriculation and/or graduation dates, etc.), employment history, skills, professional organizations, and so on. This information is stored, for example, in the database 252. Similarly, when a representative of an organization initially registers the organization with the social networking service, the representative may be prompted to provide certain information about the organization. This information may be stored, for example, in the database 252, or another database (not shown). In some example embodiments, the profile data may be processed (e.g., in the background or offline) to generate various derived profile data. For example, if a member has provided information about various job titles the member has held with the same company or different companies, and for how long, this information can be used to infer or derive a member profile attribute indicating the member's overall seniority level, or seniority level within a particular company. In some example embodiments, importing or otherwise accessing data from one or more externally hosted data sources may enhance profile data for both members and organizations. For instance, with companies in particular, financial data may be imported from one or more external data sources, and made part of a company's profile.

Once registered, a member may invite other members, or be invited by other members, to connect via the social networking service. A "connection" may require or indicate a bi-lateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member follows another, the member who is following may receive status updates (e.g., in an activity or content stream) or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed, commonly referred to as an activity stream or content stream. In any case, the various associations and relationships that the members establish with other members, or with other entities and objects, are stored and maintained within a social graph, shown in FIG. 2 with database 254.

As members interact with the various applications, services, and content made available via the social networking system 210, the members' interactions and behavior (e.g., content viewed, links or buttons selected, messages responded to, etc.) may be tracked and information concerning the member's activities and behavior may be logged or stored, for example, as indicated in FIG. 2 by the database 256. This logged activity information may then be used by the Top Jobs system 220.

In some embodiments, databases 252, 254, and 256 may be incorporated into database(s) 126 in FIG. 1. However, other configurations are also within the scope of the present disclosure.

Although not shown, in some embodiments, the social networking system 210 provides an application programming interface (API) module via which applications and services can access various data and services provided or maintained by the social networking service. For example, using an API, an application may be able to request and/or receive one or more navigation recommendations. Such applications may be browser-based applications, or may be operating system-specific. In particular, some applications may reside and execute (at least partially) on one or more mobile devices (e.g., phone, or tablet computing devices) with a mobile operating system. Furthermore, while in many cases the applications or services that leverage the API may be applications and services that are developed and maintained by the entity operating the social networking service, other than data privacy concerns, nothing prevents the API from being provided to the public or to certain third-parties under special arrangements, thereby making the navigation recommendations available to third party applications and services.

Although the front-end and back-end systems are referred to herein as being used in the context of a social networking service, it is contemplated that it may also be employed in the context of any website or online services. Additionally, although features of the present disclosure can be used or presented in the context of a web page, it is contemplated that any user interface view (e.g., a user interface on a mobile device or on desktop software) is within the scope of the present disclosure.

Figure 3:
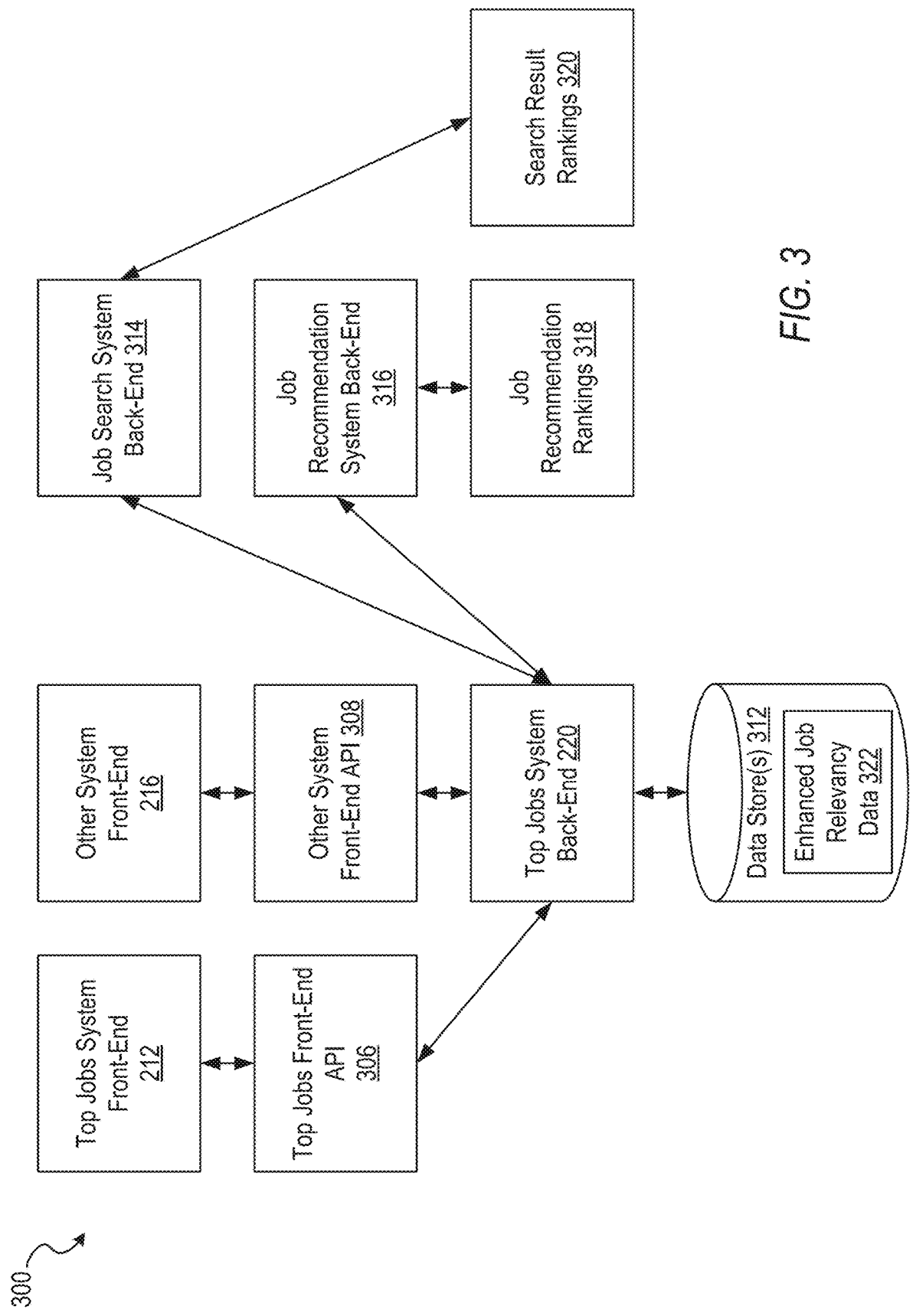
FIG. 3 is a block diagram illustrating an architecture 300 for a Top Jobs system, in accordance with an example embodiment.

FIG. 3 is a block diagram illustrating an architecture 300 for a Top Jobs system, in accordance with an example embodiment. In some example embodiments, front-end systems, including a Top Jobs system front-end 302 or a search system or job recommendation system front-end 304 provide feedback to the Top Jobs back-end system 220. Job recommendation rankings 318 may be initially generated by the job recommendation system back-end 316 and search result rankings 320 may be initially generated by the search system back-end 314. These initially generated rankings may be re-ranked in real-time based on by the feedback received at the Top Jobs back-end system 220 and enhanced job relevancy data 322 (described below) stored in data store(s) 312 and maintained by the Top Jobs system back-end 220. The front-end systems 212 and 218 may then incorporate the real-time re-rankings into one or more user interfaces for presentation on one or more devices of a user of the networked system 102.

The architecture 300 is provided as an example embodiment. It is contemplated that variations of architecture 300 as described herein may be made and still be within the scope of the present disclosure.

Figure 4:
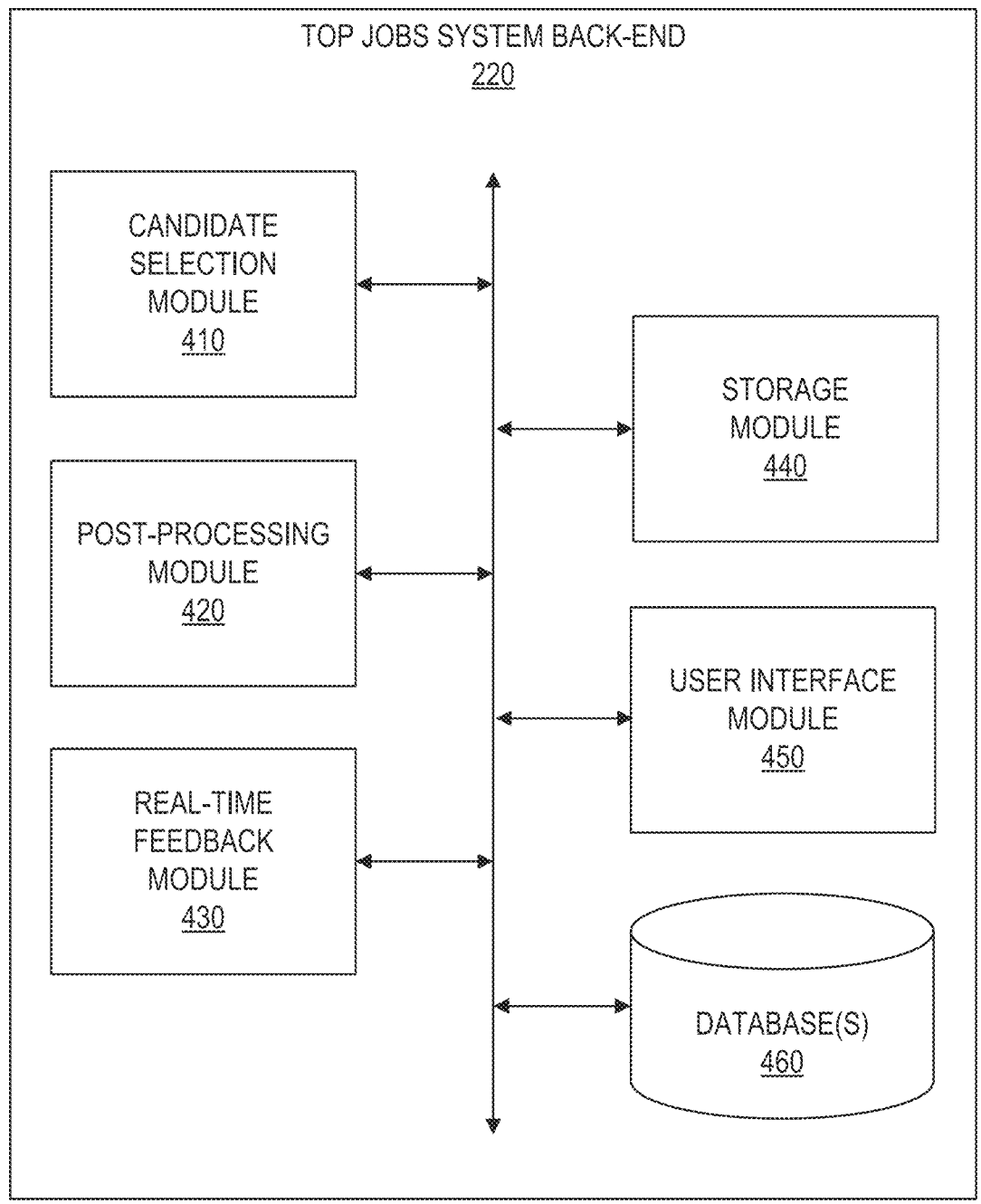
FIG. 4 is a block diagram illustrating components of the Top Jobs back-end system, in accordance with an example embodiment.

FIG. 4 is a block diagram illustrating components of the Top Jobs back-end system 220, in accordance with an example embodiment. In some embodiments, the Top Jobs back-end system 220 comprises any combination of one or more modules, such as a candidate selection module 410, a post-processing module 420, a real-time feedback module 430, a storage module 440, and a user interface module 450, and one or more database(s) 460. The modules 410, 420, 430, 440, and 450 and the database(s) 460 can reside on a machine having a memory and at least one processor (not shown). In some embodiments, the modules 410, 420, 430, 440, and 450, and the database(s) 460, can be incorporated into the application server(s) 118 in FIG. 1 (e.g., as one or more of the application(s) 120). In some example embodiments, the database(s) 460 is incorporated into database(s) 126 in FIG. 1 and can include any combination of one or more of databases 252, 254, and 256 in FIG. 2. However, it is contemplated that other configurations of the modules 410, 420, 430, 440, and 450, as well as the database(s) 460, are also within the scope of the present disclosure.

In some example embodiments, one or more of the modules 410, 420, 430, 440, and 450 is configured to perform various communication functions to facilitate the functionality described herein, such as by communicating with the social networking system 210 via the network 104 using a wired or wireless connection. Any combination of one or more of the modules 410, 420, 430, 440, and 450 may also provide various web services or functions, such as retrieving information from the third party servers 130 and the social networking system 210. Information retrieved by the any of the modules 410, 420, 430, 440, and 450 may include profile data corresponding to users and members of the social networking service of the social networking system 210.

Additionally, any combination of one or more of the modules 410, 420, 430, 440, and 450 can provide various data functionality, such as exchanging information with database(s) 460 or servers. For example, any of the modules 410, 420, 430, 440, and 450 can access member profiles that include profile data from the database(s) 460, as well as extract attributes and/or characteristics from the profile data of member profiles. Furthermore, the one or more of the modules 410, 420, 430, 440, and 450 can access social graph data and member activity and behavior data from database (s) 460, as well as exchange information with third party servers 130, client machines 110, 112, and other sources of information.

In some example embodiments, candidate selection module 410 is configured to, during a first-pass phase, modify a back-end model query configuration initially generated by one of the back-end systems 220, 314, or 316 in response to input received from a user (e.g., via front-end 212 or 218). In example embodiments, the user input includes one or more search terms. The initially-generated model query configuration is based on the one or more of the search terms as well as one or more facets. The effect of the modifying of the model query configuration is to perform a first pass over the initially-generated query model to improve the precision of the back-end query to data store(s) 312 before the back-end query is submitted. Thus, starting with the initially-generated query model, the candidate selection module 410 utilizes candidate selection to ensure the removal of bad candidates and retrieval of only the job posting that the user is most likely to be interested in. In example embodiments, the candidate selection includes filtering the user's blacklisted companies from the candidate set. This filtering may be performed by inserting negation clauses into the initially-generated model query configuration. In example embodiments, a source field (e.g., from data store(s) 312) is identified in the model query configuration and refers to companies that are included in the user's blacklist. For example, an entry such as the following entry may be added to an initially-generated model query configuration to filter blacklisted companies from results that are returned upon submission of the query:

Sample Model Query Configuration:

```
{
    "name": "blacklisted_company",
    "classname":
"com.linkedin.liar.query.processors.TermQueryProcessor",
        "sourceField": "member_feedback.blacklisted_companies",
        "targetField": "company",
        "parameters": {
            "occur": "MUST_NOT"
        }
}
```

In example embodiments, the user's blacklisted companies are identified based on company identifiers extracted from job postings that the user has dismissed via a user interface as not being relevant to the user and are stored in data store(s) 312 for access by the Top Jobs system back-end 220.

The post-processing module 420 is configured to, in a post-processing phase, downweight job attributes (e.g., job titles, geographical locations, and so on) matching reasons specified by the user for dismissing a job posting. In example embodiments, a post-processing plug-in is created for each job attribute associated with the job posting. The post-processing plug-in aggregates the number of dismissals for each value of the job attribute. For example, the plug-in for job title will aggregate the number of dismissals of each job title (e.g., "civil engineer" or "mechanical engineer") by the user. In example embodiments, the post-processing plug-in applies an exponential decay-based weight to jobs that match these job attribute values to penalize the scores of the matching jobs.

For example, if a user dismissed jobs J1, J2 ... JN for the reason of job title T1, the post-processing module 420 aggregates the number of times the user dismissed a job for that reason for that job title (N). For all jobs that match that job title T1, the post-processing module 420 reduces their scores by a multiplicative factor of $e^{**}-N$. The exact function to use for downweighting can be determined through application of a machine-learning algorithm or specified by an administrator or user (e.g., as a preference setting). With this approach, jobs with a particular downweighting job attribute will eventually be reduced to a score of 0.0. The same logic, reversed, applies for uplifting jobs, with a positive boost towards a score of 1.0.

The real-time feedback module 430 is configured to, in an extended relevance analysis phase, incorporate a larger number of signals, besides just a positive signal (e.g., "more like this") or negative signal (e.g., "less like this"), such as member activity and behaviour data 256, including applications for jobs, article interactions, feed interactions, postings of comments, sharing of links, etc. The real-time feedback module 430 also provides support for enhanced query re-writing.

In example embodiments, when a user dismisses a job there can be multiple reasons for it, such as the company not being of interest, the title being a mismatch, or the seniority being mismatch. The real-time feedback module 430 is configured to explicitly ask users for a reason when they dismiss a job. In example embodiments, job posting retrieval queries are rewritten to bias the retrieval against candidates having values for attributes that that the user has explicitly mentioned they are not interested in or for which there is a mismatch. In example embodiments, the real-time feedback module 430 utilizes a decay function weighted by the time since the action was taken to ensure filtered candidates reflect the user's explicitly-stated preferences. In example embodiments, if a dismissed job posting reaches a predetermined threshold, additional job postings matching that criteria will be removed completely from the candidate set. Eventually, however, as the decay function kicks in, the job posting may once again fall beneath the threshold and be included in the results.

As an example, consider a user who is a "software engineer—data mining" at Google. The recommendation that this user dismissed was for a title UX Researcher. In example embodiments, the user may explicitly indicate that the title was a mismatch. In the retrieval query, the real-time feedback module 430 explicitly adds a decay on the number of documents we expect for the title UX Researcher. This ensures that in future recommendations there are fewer of such jobs. The drop in the amount of such jobs will be drastic as the user continues to dismiss jobs having this title. Once a threshold is reached, the user will not see UX Researcher jobs anymore. The whole process occurs in real time—e.g., the next call to retrieve recommendations for a user incorporates feedback that was previously received, requiring no separate offline processing.

As an extension of the above approach, the real-time feedback module 430 includes more jobs that the user shows interest in through real-time interactions captured by the real-time feedback module 430.

As another example, job interaction data can serve as rich feedback to improve the search results as users engage with them. The real-time feedback module 430 can utilize dismiss data (e.g., from the job recommendation system front-end 218 or the Top Jobs front-end 212) and augment a search retrieval query to reduce and limit the search results that match attributes of job postings that have been dismissed by the user. At the same time, the real-time feedback module 430 considers the fact that users might search for queries outside their domain. Thus, the real-time feedback module 430 uses a Query-Profile similarity measure to help understand how the query is related to the user (e.g., based on profile data 252, social graph data 254, or member activity and behavior data 256). The real-time feedback module 430 also considers member activity and behaviour data 256 and social graph data 254, such as interactions by the user with respect to a data feed, company pages, and so on, to augment the query with user interests.

The storage module 440 is configured to support create, get, delete, and update database operations (e.g., via an API, such as a Rest.li API). The storage module 440 is configured to allow finding of feedback data items (e.g., by owner). In example embodiments, the finding of feedback data items may be limited to a specific time range, such as the last modified time, which provides useful data to target each member's or guest's interest. Each feedback data item may be a union of different feedback types. For example, feedback data items may relate to direct user input from job postings, and may include the job posting, the action taken by the user (dismiss or interested), the reasons the action was taken on this job posting (title, function, seniority level, organization, location, or user's input), and whether the job was shown in a sponsored context (e.g., the job was presented to the user based on an entity having paid a fee to an operator of the networked system). In example embodiments, each feedback data item is associated with a database record (e.g., in database(s) 460) that includes a unique resource name for the owner (e.g., the user) and an auto-incremented feedback identifier. In example embodiments, the last modified time has a native index type to support quick retrieval of feedback in a time range.

The user interface module 450 is configured to provide a variety of user interface functionality, such as generating user interfaces, interactively communicating generated user interfaces to one or more devices of the user (e.g., to the front-ends 212 or 218), receiving information from the user (e.g., interactions with user interfaces), and so on. Information may be presented using a variety of means including visually displaying information and using other device outputs (e.g., audio, tactile, and so forth). Similarly, information may be received via a variety of means including alphanumeric input or other device input (e.g., one or more touch screen, camera, tactile sensors, light sensors, infrared sensors, biometric sensors, microphone, gyroscope, accelerometer, other sensors, and so forth). In some example embodiments, the user interface module 450 is configured to receive user input. For example, the user interface module 450 can generate one or more GUI elements (e.g., drop-down menu, selectable buttons, text field) with which a user can submit input.

Figure 5:
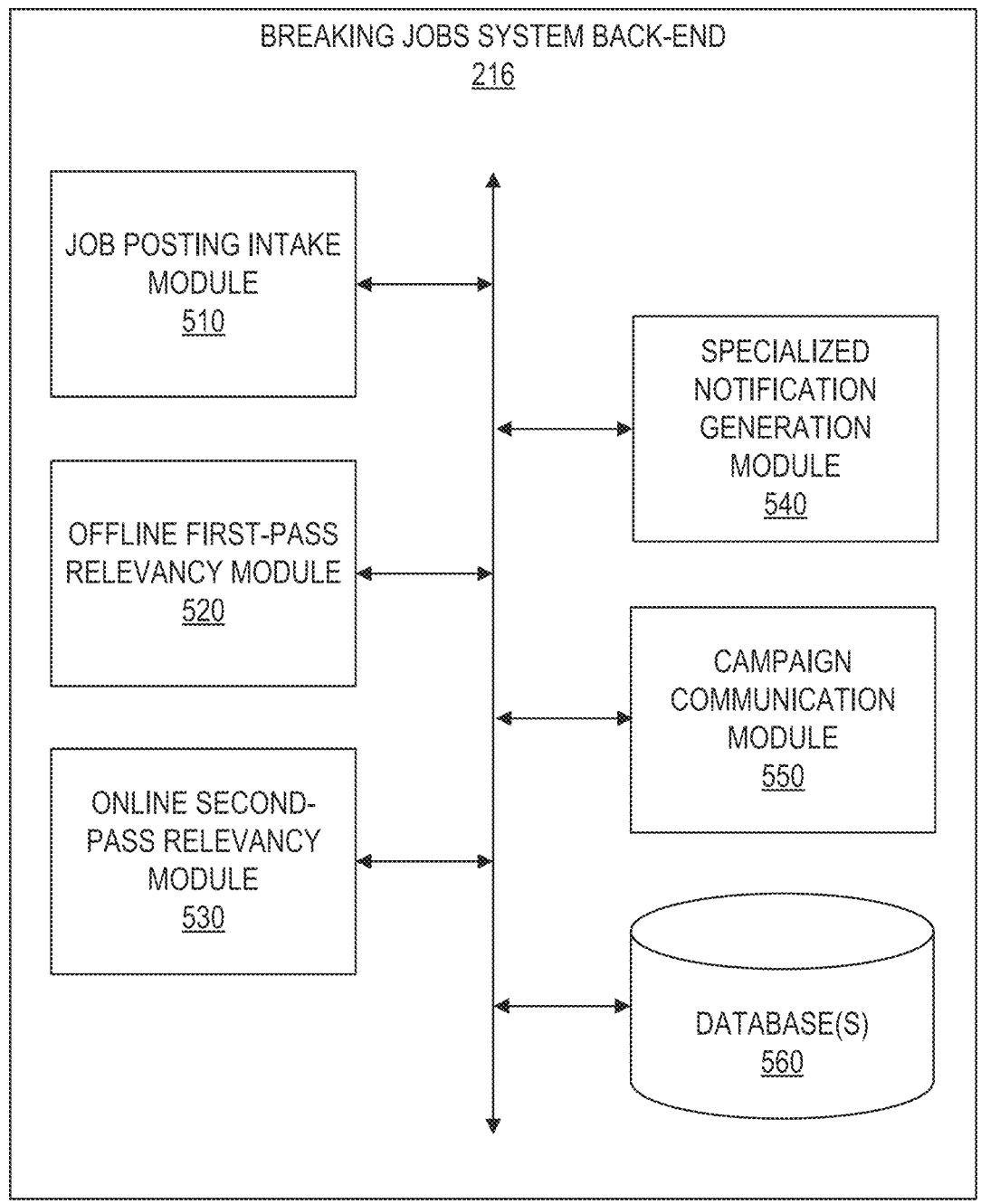
FIG. 5 is a block diagram illustrating components of the Breaking Jobs back-end system, in accordance with an example embodiment

FIG. 5 is a block diagram illustrating components of the Breaking Jobs back-end system 222, in accordance with an example embodiment. In some embodiments, the Breaking Jobs back-end system 220 comprises any combination of one or more modules, such as a job posting intake module 510, an offline first-pass relevancy module 520, an online second-pass relevancy module 530, a specialized notification generation module 540, a campaign communication module 550, and one or more database(s) 560. The modules 510, 520, 530, 540, and 550 and the database(s) 560 can reside on a machine having a memory and at least one processor (not shown). In some embodiments, the modules 510, 520, 530, 540, and 550, and the database(s) 560, can be incorporated into the application server(s) 118 in FIG. 1 (e.g., as one or more of the application(s) 120). In some example embodiments, the database(s) 560 is incorporated into database(s) 126 in FIG. 1 and can include any combination of one or more of databases 252, 254, and 256 in FIG. 2. However, it is contemplated that other configurations of the modules 510, 520, 530, 540, and 550, as well as the database(s) 560, are also within the scope of the present disclosure.

In some example embodiments, one or more of the modules 510, 520, 530, 540, and 550 is configured to perform various communication functions to facilitate the functionality described herein, such as by communicating with the social networking system 210 via the network 104 using a wired or wireless connection. Any combination of one or more of the modules 510, 520, 530, 540, and 550 may also provide various web services or functions, such as retrieving information from the third party servers 130 and the social networking system 210. Information retrieved by the any of the modules 510, 520, 530, 540, and 550 may include profile data corresponding to users and members of the social networking service of the social networking system 210.

Additionally, any combination of one or more of the modules 510, 520, 530, 540, and 550 can provide various data functionality, such as exchanging information with database(s) 560 or servers. For example, any of the modules 510, 520, 530, 540, and 550 can access member profiles that include profile data from the database(s) 560, as well as extract attributes and/or characteristics from the profile data of member profiles. Furthermore, the one or more of the modules 510, 520, 530, 540, and 550 can access social graph data and member activity and behavior data from database(s) 560, as well as exchange information with third party servers 130, client machines 110, 112, and other sources of information.

A job-posting intake module 510 is configured to receive a large quantity of new job postings (e.g., tens of thousands per day). An offline first-pass relevancy module 520 may be configured to identify a plurality of members of the social networking system 210 for which each of the received new job postings is relevant. An online second-pass relevancy module 530 may be configured to adjust the aggregate relevancy score for each member based on enhanced relevancy data, including feedback data collected in real-time from the plurality of members. A specialized notification generation module 540 may be configured to generate a specialized notification of the identified top job for the user. A campaign communication module 550 may be configured to incorporate the specialized notification into a centralized messaging platform associated with the social networking system 210.

Figure 6:
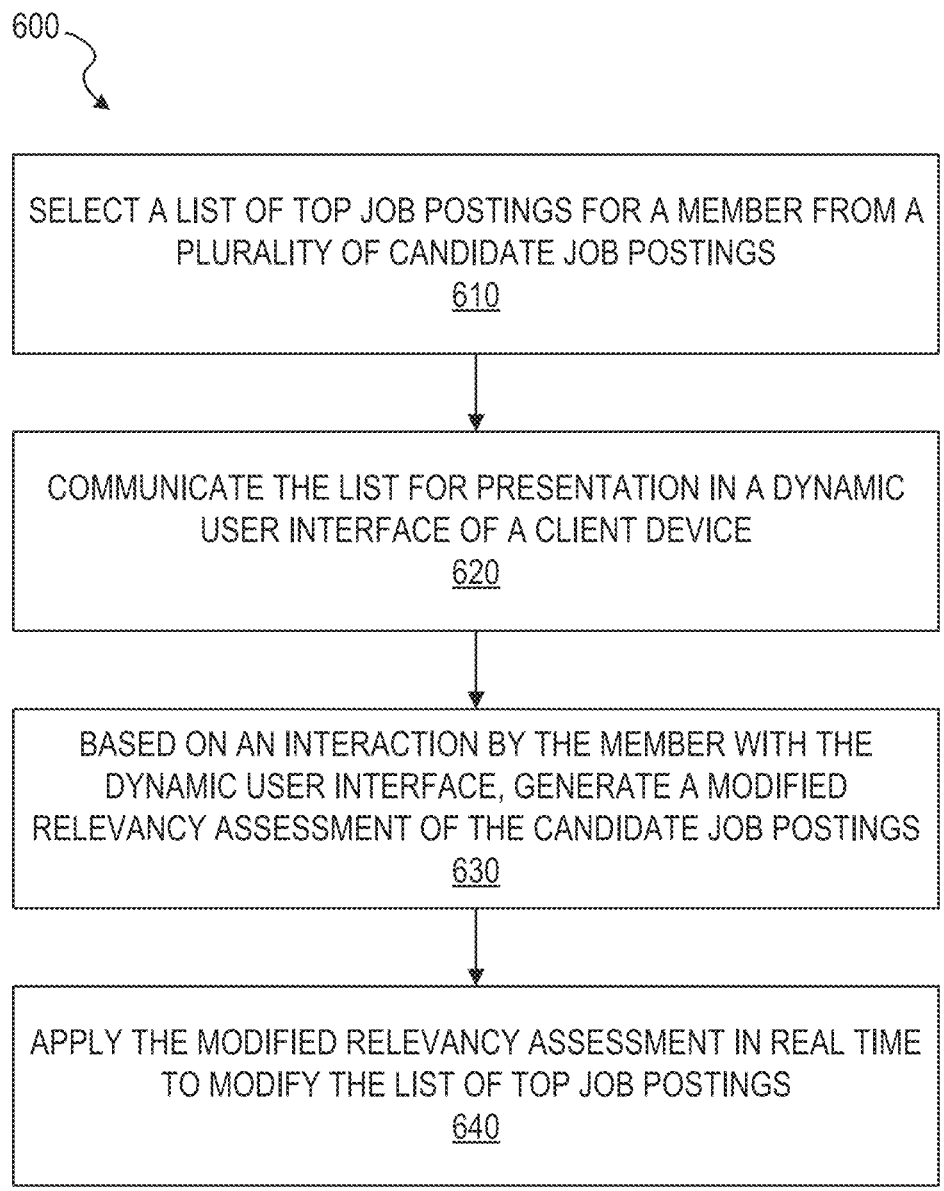
FIG. 6 is an example method of modifying a relevancy assessment of job posting data in real time for a member of a social networking system.

FIG. 6 is an example method 600 of modifying a relevancy assessment of job posting data in real time for a member of a social networking system. In example embodiments, the method 600 is performed by one or more modules of the Top Jobs system back-end 220 or one or more modules of the Top Jobs system front-end 212. At operation 610, a list of top job postings for a member is selected from a plurality of candidate job postings. In example embodiments, the list is limited to a maximum number over a time period (e.g., 10 per day). In this way, the user may be encouraged to access the social networking system at each time period to learn whether additional top job postings have been identified for the member. In example embodiments, an initial relevancy score for each candidate job posting is calculated (e.g., based on a matching of the user's profile, behavior, social networking, or preference data to attributes of each candidate job posting).

In example embodiments, match scores for each attribute of the job posting are calculated, such as expected salary, desired skills, education requirement, number of social networking connections of the member employed at the hiring company, number of alumni of the member's current company who work at the hiring company, number of alumni of the hiring company who work at the member's current company, a trending score associated with jobs offered at the company, a number of previous indications of interest by the member in jobs posted by the company (e.g., whether the member has previously saved one or more jobs posted by the company), a number of times that the member has applied for previous jobs posted by the company, how quickly headcount for the company is growing, specializations of the company (e.g., business sectors of focus), and so on. Each of the match scores may then be weighted (e.g., based on one or more of member preferences, administrator preferences, or previously-received member feedback) and aggregated to determine the initial relevancy score. A predetermined number of the top candidates jobs passing an initial relevancy threshold value may then be selected as the member's top jobs. In example embodiments, the relevancy of a particular job posting may be boosted based on recency of the job posting, making more recent postings of similar job openings have a higher relevancy. In example embodiments, jobs not having a recency within a certain interval (e.g., 24 hours) are eliminated from consideration as a top job.

In example embodiments, the initial relevancy threshold value may be determined based on a liquidity of identified top jobs that are available to provide to members over a time period. For example, given initial relevancy scores for each candidate job posting, the initial relevancy threshold value may be set based on a liquidity of top jobs identified being enough to allow a certain percentage (e.g., 75%) of members to have a top job identified for them at least once per week. In example embodiments, the initial relevancy threshold value may be determined based on a ratio of positive assessments and negative assessments received from a user regarding the relevancy of the job posting in comparison to the relevancy score. For example, the initial relevancy threshold may be set based on the relevancy score at which the positive/negative feedback ratio is determined to be at least one. In example embodiments, the positive assessment may be an application by the member for the job that is the subject of the posting or a saving of the job posting by the member and the negative assessment may be a dismissal of the job posting by the member (with or without reasons specified).

At operation 620, the list is communicated for presentation to the member in a dynamic user interface of the client device. In example embodiments, upon accessing the social networking system (e.g., via a web browser or an application executing on the client device), the member may be notified that a number of top jobs have been identified for the member and the member may be prompted to access the dynamic user interface to see them (see, e.g., FIG. 8). In response to an affirmative activation of the prompt, the dynamic user interface may then be presented to the member. In example embodiments, the dynamic user interface is a carousel- or card-stack-style user interface, such the user interface depicted in FIG. 9 or the user interface depicted in FIG. 10, respectively (described in more detail below).

At operation 630, a modified relevancy assessment of the candidate job postings is generated based on one or more interactions by the member with the dynamic user interface.

In example embodiments, the dynamic user interface presents information about a first of the top jobs as a top card of the card stack or a first item of the carousel. The user may browse through the top jobs by swiping the top card or currently-selected carousel item. Thus, the user may skip from one top job to the next without providing any indication of an interest in the item. In example embodiments, the information about each top job may provide one or more insights or reasons why the top job was selected from the candidate job postings. For example, the information may specify that the expected salary matches the user's salary preference or that the user is qualified for the job based on the user's level of experience or education. In example embodiments, a summary of such insights may be presented to the user and a user interface elements may be provided to allow the user to access more complete information pertaining to the reasons why the job was selected for the user as a top job.

In example embodiments, a user's behavior in browsing the items in the user interface or accessing more complete insights about one or more job postings may or may not be used to adjust a relevancy score for the item (e.g., depending on user or administrator preferences, or machine-learned significance from past user behaviors). Additionally, each card or carousel item may include user interface elements to allow the user to interact with each item presented in the dynamic user interface by, for example, providing a positive (e.g., "SAVE") indication or a negative (e.g., "NOT FOR ME") indication of an interest by the member in the job posting. Upon receiving such an indication, one or more matching scores between the member's user data and attributes of the job posting may be adjusted, or one or more weightings associated with the matching scores may be adjusted, as discussed above.

In example embodiments, upon providing a positive or negative indication of interest, the user may be prompted to provide one or more reasons for the indication. In example embodiments, one or more of the reasons is selected from attributes of the job posting. For example, the user may be prompted to specify whether it was one or more of the attributes of the job posting in particular that was the most significant reason that the user provided the positive or negative expression of interest, or whether there was another reason. Such attributes may include any attributes described herein, including title, location, level of experience, education, salary, skills, connection flavor (e.g., amount of connectivity to the user's social network, company network, or school network), amount of the user's connection to the hiring company (e.g., the user's previous saved or applied to jobs associated with the hiring company, whether the user follows the company, and so on), headcount growth of company over a time period (e.g., six months), the trending score of jobs at the company (e.g., based on velocity of views over a time period, such as the last week), company specialities, popularity of the company (e.g., based on mentions of the company included in posts on the social network within a time period, such as the last week), stock price of the company over a time period, such as the last 52 weeks, an industry associated with the company, a size of the company (e.g., whether the user would be one of the first 10, 50, or 100 employees), and so on.

In example embodiments, the reasons may be ranked based on user preferences or machine-learned preferences, such as behaviors of other users having a similar profile to the target user when presented with the reasons prompt. In example embodiments, a selected subset of the reasons are presented to the user (e.g., the top five reasons by ranking) for selection by the user. In example embodiments, the ranking of the reasons may be based on explicit surveys taken by the users.

At operation 640, the modified relevancy assessment is applied in real time to modify the list of top job postings. For example, if, upon adjusting the matching scores or weightings, it is determined that relevancy score of a previously-selected top job no longer satisfies the relevancy score threshold value, the job may be removed from the list of top jobs. If, on the other hand, the adjusting indicates that one or more additional candidate jobs now satisfy the relevancy score threshold value, the one or more additional candidate jobs may be added to the top jobs list (assuming a predetermined maximum number of top jobs over a time period has not been exceeded). In example embodiments, the user may be provided with an option in the dynamic user interface to view or clear previously-submitted feedback items. Upon clearing a feedback item, the matching scores or weightings associated with the item may be adjusted again. In example embodiments, if no top jobs have been identified for a user within a predetermined period of time, the user may be prompted to clear previously-submitted feedback items, which, in turn, will relax the criteria for identification of top jobs for the user.

Figure 7:
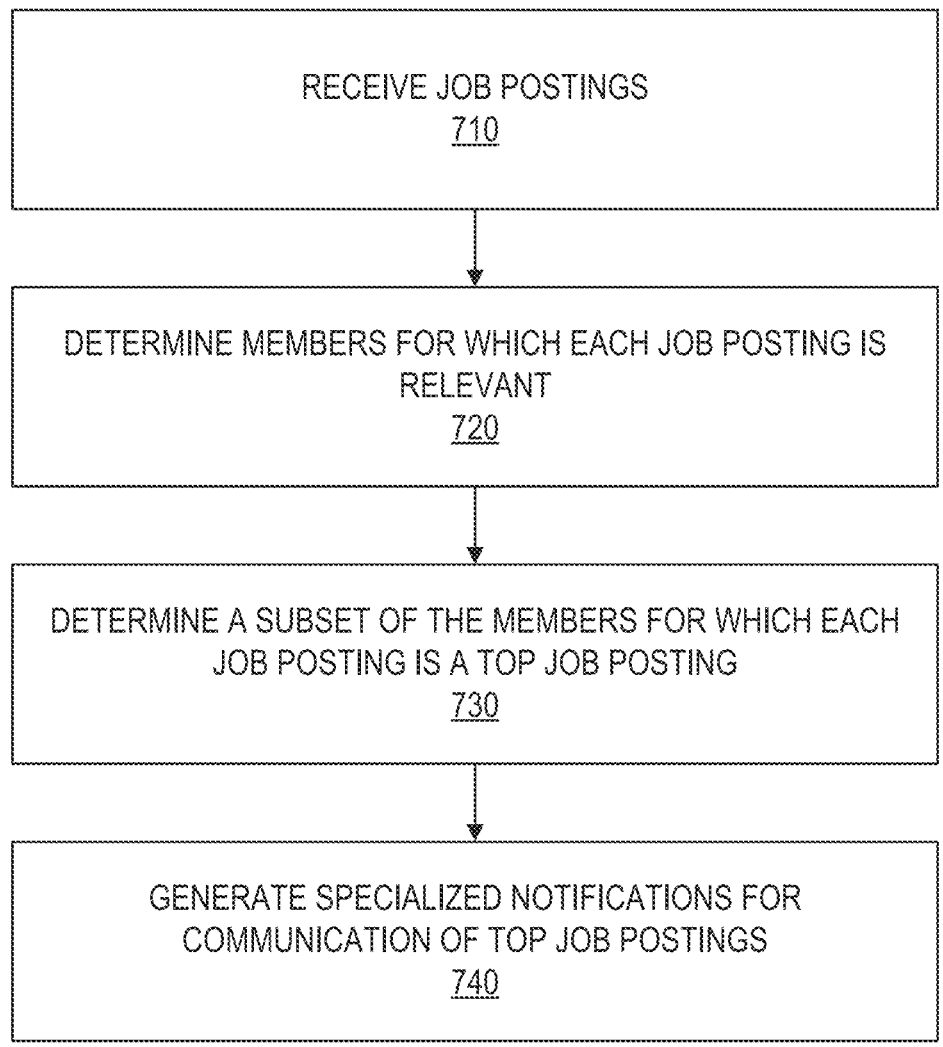
FIG. 7 is an example method of communicating breaking jobs to selected members of a social networking system.

FIG. 7 is an example method 700 of communicating breaking jobs to selected members of a social networking system. In example embodiments, the method 700 is performed by one or more modules of the Breaking Jobs system back-end 222 or one or more modules of the Breaking Jobs system front-end 214.

At operation 710, a large quantity of new job postings (e.g., tens of thousands per day) are received. In example embodiments, the job postings are received from one or more job recruiters via one or more job posting user interfaces included in the front-end layer for the social networking system 210 or via scraping of job postings posted on corporate web sites. The job-posting intake module 510 may store the job postings in the one or more database(s) 560.

At operation 720, a plurality of members of the social networking system 210 are identified for which each of the received new job postings is relevant. In an example embodiments, the determination of the relevancy is based on first-pass relevancy determination that includes executing one or more batch offline (e.g., Hadoop) processes for determining matching scores for each attribute of each job posting with member data for each member of the social networking system 210, including at least one profile data 252, social graph data 254, and member activity and behavior data 256, as well as an aggregate relevancy score for each member with respect to the job posting, as described above with respect to FIG. 6.

At operation 730, the aggregate relevancy score for each member is adjusted based on enhanced relevancy data, including feedback data collected in real-time from the plurality of members. The feedback data may include indications of positivity or negativity of other members with respect to the relevancy of the job posting, as well as reasons for the indications of the positivity or negativity, as described above with respect to FIG. 6. In example embodiments, the online second-pass relevancy module 530 identifies a subset of the identified plurality of members for which the job posting is a top job posting. In example embodiments, a top job posting is a job posting that exceeds a relevancy threshold value, as described in more detail above with respect to FIG. 6.

At operation 740, a specialized notification is generated for each member for which a job posting has been identified as a top job. In example embodiments, the specialized notification includes one or more visual indicators of the reasons for the identification of the job posting as a top job for the user. The visual indicators may correspond to one or more insights associated with the job, including any of the one or more insights discussed above with respect to FIG. 6. In example embodiments, the specialized notifications are incorporated into a centralized messaging platform associated with the social networking system 210. In example embodiments, the campaign communication module 550 may receive messages from one or more back-end systems of the social networking system 210 and prioritize the messages for communication to the members. In example embodiments, the campaign communication module 550 may be configured (e.g., via preferences specified by the member) to periodically (e.g., daily or weekly) generate and send messages that include recommendations of job postings that are relevant to the member. In example embodiments, upon a determination that a top job has been identified for the user, the previously-scheduled message corresponding to the job-recommendation back-end may be replaced by a specialized message pertaining to the job posting that was identified as a top job for the user. In example embodiments, if the previously-scheduled message will not be delivered to the user in a timely fashion (e.g., within 24 hours of the identification of the top job), the campaign communication module 550 may determine to send a new communication to the member that includes the notification of the breaking job. In example embodiments, the breaking jobs front-end 214 generates a user interface for the specialized message and communicates it to the campaign communication module 550.

Figure 8:
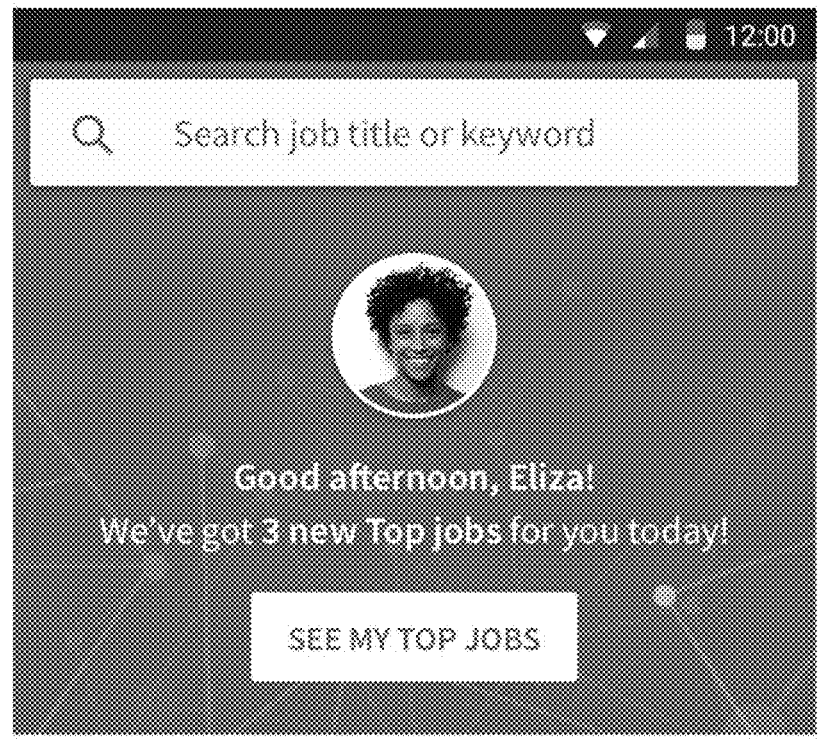
FIG. 8 is a screenshot of an example user interface for notifying a user of an identification of a set of top jobs for the user.

FIG. 8 is a screenshot of an example user interface 800 for notifying a user of an identification of a set of top jobs for the user. In example embodiments, the top job systems front-end presents the example user interface 800 based on an accessing of the social networking system by the user and an identification by the Top Jobs back-end system that at least one top job has been identified for the user. In example embodiments, the notification specifies a number of top jobs identified and a user interface element (e.g., "SEE MY TOP JOBS") for accessing the list of a top jobs. Additionally, the user interface may include information pertaining to job preferences, including a date at which the user last updated the job preferences, and a user interface element (e.g., "UPDATE") for accessing the job preferences. The job preferences user interface (not shown) may allow the user to view or clear previously-submitted feedback or explicitly specify weightings for job attributes and values that affect the matching scores for the attributes (described above) or their associated weightings. In example embodiments, the "Top Jobs" notification may be presented in conjunction with a list of job recommendations (e.g., generated by job-recommendation back-end and presented by a job-recommendation front-end). However, this list of job recommendations may not include selected top jobs (e.g., they may just be the best of the rest), may be ranked based on relevancy data that does not include user feedback data or is not generated in real time, or include weightings for sponsored listings (e.g., based on a fee being paid by an advertiser of the job posting) and thus the relevancy of the job recommendations may not be as accurate as the top jobs listing. Furthermore, in contrast to the Top Jobs listing, the list of job recommendations may include job postings having low relevancy to the user (e.g., job postings that do not pass the initial relevancy threshold value).

Figure 9:
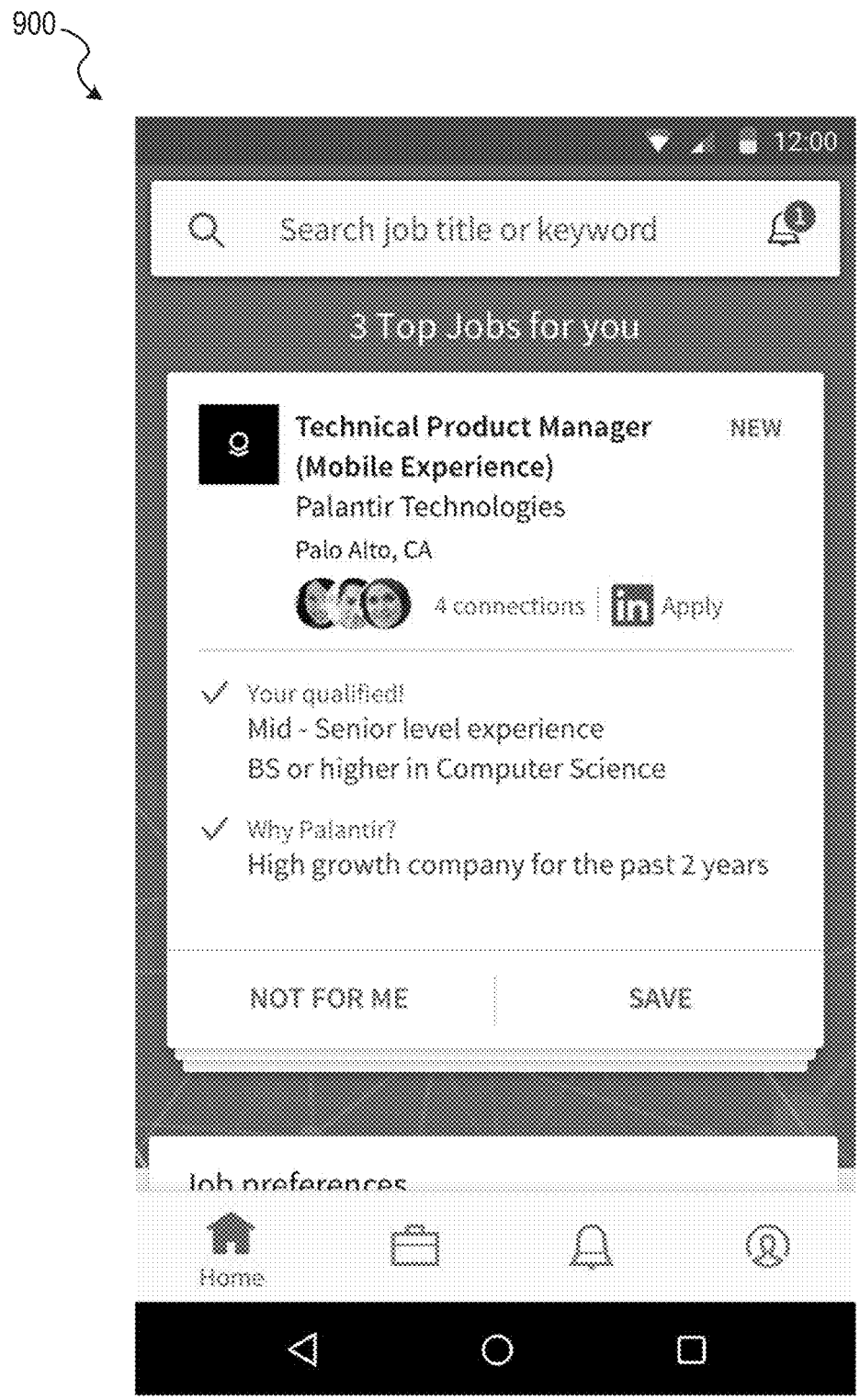
FIG. 9 is a screenshot of an example user interface for presenting the identified list of top jobs to the user.

FIG. 9 is a screenshot of an example user interface 900 for presenting the identified list of top jobs to the user. In example embodiments, the user interface 900 is presented by the top jobs system front-end in response to an indication of an expression of interest by the user to view the top jobs for the user identified by the top jobs system back-end. In example embodiments, the user interface 900 may be a card-stack-style user interface, with each card in the stack corresponding to one of the identified top jobs. In example embodiments, each card may include a user interface element (e.g., a skip button or link), not shown, to allow the user to browse the top jobs without providing a positive or negative indication of interest. In example embodiments, the information presented on each card may be a summary of information about the job posting, including, for example, the title of the job, the company that is hiring, the location of the job, and so on. In example embodiments, the summary may also include one or more insights pertaining to the reason why the job was selected as a top job for the user, including a date of the posting of the job, how many connections of the user are currently working at the hiring company, how the qualifications of the user correspond to the job requirements (e.g., level of experience or education), information about the success of the company (e.g., growth rate, stock price, and so on).

In example embodiments, for at least some insights, information pertaining to job coverage and member coverage may be presented to the user. For example, for a salary insight, the job coverage data may specify a percentage of people at the company employed in the advertised function who receive the advertised salary or higher. The member coverage data for the salary insight may specify a percentage of members of the social network employed at the hiring company who receive the advertised salary or higher. As another example, for a skills match insight, the job coverage data may specify a percentage coverage of the target user's skills of the skills required for the position. The member coverage data for the skills insight may specify a percentage number of users of the social network who have one or more of the required skills. In example embodiments, the coverage data may include a measurement of precision. Thus, as an example, for the skills match insight, the job coverage data may specify that the user has a 45% coverage of the required skills for the position with an 80% precision, but only an 18% coverage at a 95% precision; thus highlighting the precision of the match between skills specified in the user's profile with skills in the job posting.

In example embodiments, a subset of the insights (e.g., a predetermined number) may be shown to the user and an option may be provided for the user to view the full set of insights on a separate portion of the user interface.

In example embodiments, each card includes a user interface element (e.g., "NOT FOR ME") for providing a negative assessment of the relevancy of the job posting to the user and a user interface element (e.g., "SAVE") for providing a positive assessment of the relevancy of the job posting to the user. Upon activating one of these user interface elements to specify a positive or negative assessment of the relevancy of the job posting, the matching scores or weightings for attributes associated with the job posting are adjusted for the user. In example embodiments, upon receiving assessment of a job posting, the corresponding card is removed from the stack of cards.

Figure 10:
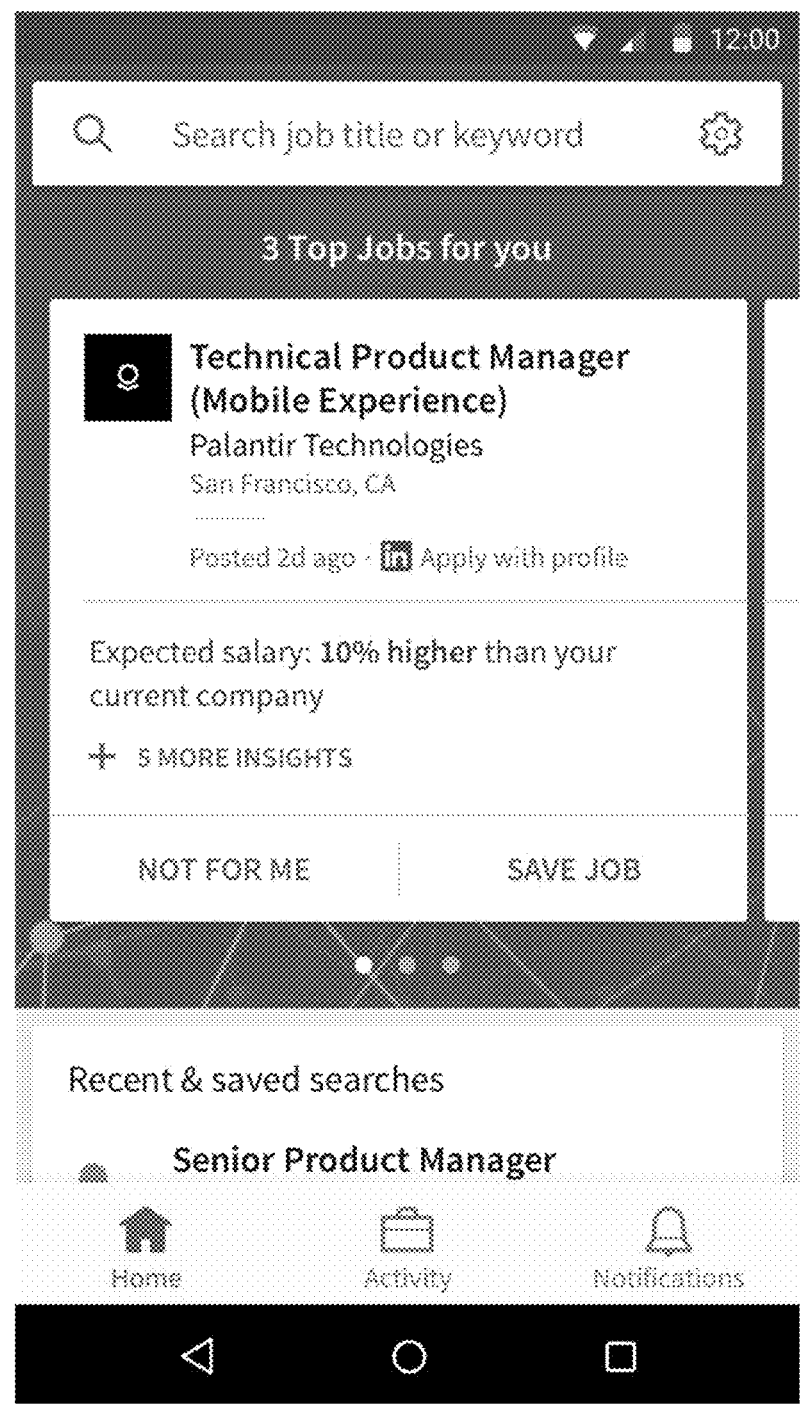
FIG. 10 is a screenshot of another example user interface for presenting the identified list of top jobs to the user.

FIG. 10 is a screenshot of another example user interface 1000 for presenting the identified list of top jobs to the user. In example embodiments, the user interface 900 is presented by the Top Jobs system front-end in response to an indication of an expression of interest by the user to view the top jobs for the user identified by the Top Jobs system back-end. In example embodiments, the user interface 1000 may be a carousel-style user interface, with each item in the carousel corresponding to one of the identified top jobs. In example embodiments, the user may scroll through the carousel items to browse the top jobs without providing a positive or negative indication of interest. In example embodiments, just as with cards in the example user interface 800, the information presented on each carousel item may be a summary of information about the job posting, including, for example, the title of the job, the company that is hiring, the location of the job, and so on. In example embodiments, the summary may also include one or more insights pertaining to the reason why the job was selected as a top job for the user, including a date of the posting of the job, how many connections of the user are currently working at the hiring company, how the qualifications of the user correspond to the job requirements (e.g., level of experience or education), information about the success of the company (e.g., growth rate, stock price, and so on). In example embodiments, a subset of the insights may be shown to the user and an option may be provided for the user to view the full set of insights on a separate portion of the user interface. In example embodiments, each carousel item includes a user interface element (e.g., "NOT FOR ME") for providing a negative assessment of the relevancy of the job posting to the user and a user interface element (e.g., "SAVE JOB") for providing a positive assessment of the relevancy of the job posting to the user. Upon activating one of these user interface elements to specify a positive or negative assessment of the relevancy of the job posting, the matching scores or weightings for attributes associated with the job posting are adjusted for the user. In example embodiments, upon receiving assessment of a job posting, the corresponding carousel item is removed from the carousel.

Figure 11:
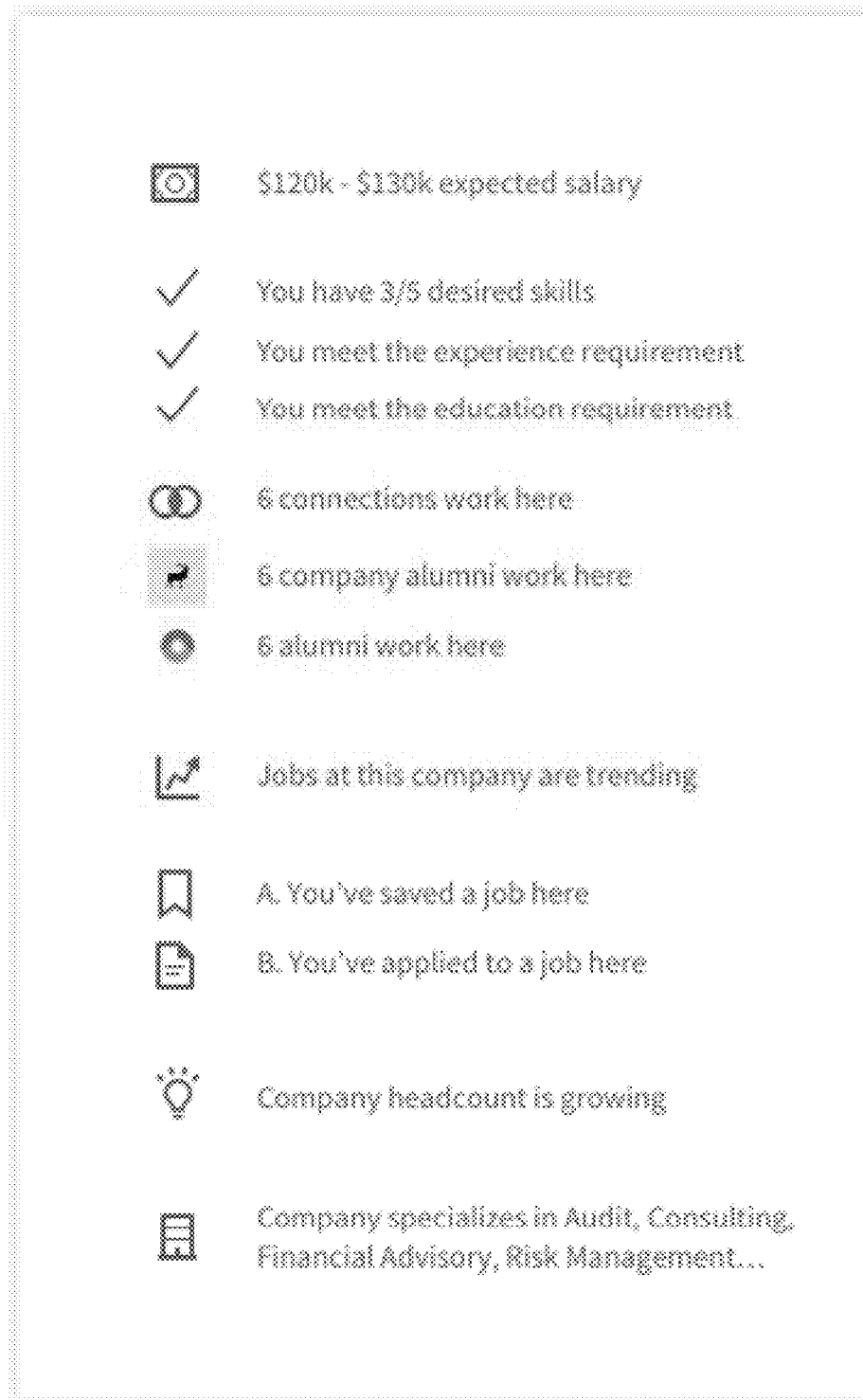
FIG. 11 is a screenshot of an example user interface portion for displaying insights to the user about why the job was selected from the candidate jobs as a top job for the user.

FIG. 11 is a screenshot of an example user interface portion 1100 for displaying insights to the user about why the job was selected from the candidate jobs as a top job for the user. In example embodiments, attributes of the job that were used to make the selection may be ranked (e.g., based on weighted matching scores) and presented to the user. Such attributes may include, for example, expected salary, number of desired skills, amount of experience, amount of education, number of connections employed by the hiring company, number of alumni of the user's current company that are employed at the hiring company, number of alumni of the hiring company that work at the user's current company, a trending score for jobs at the hiring company, a number of jobs that the user has saved that were posted by the hiring company, a number of jobs to which the user applied that were posted by the hiring company, a growth rate of head count at the hiring company, an employment type of the position (e.g., contract or full-time), an industry of the company (e.g., "construction"), and areas of industry specialization at the hiring company.

Figure 12:
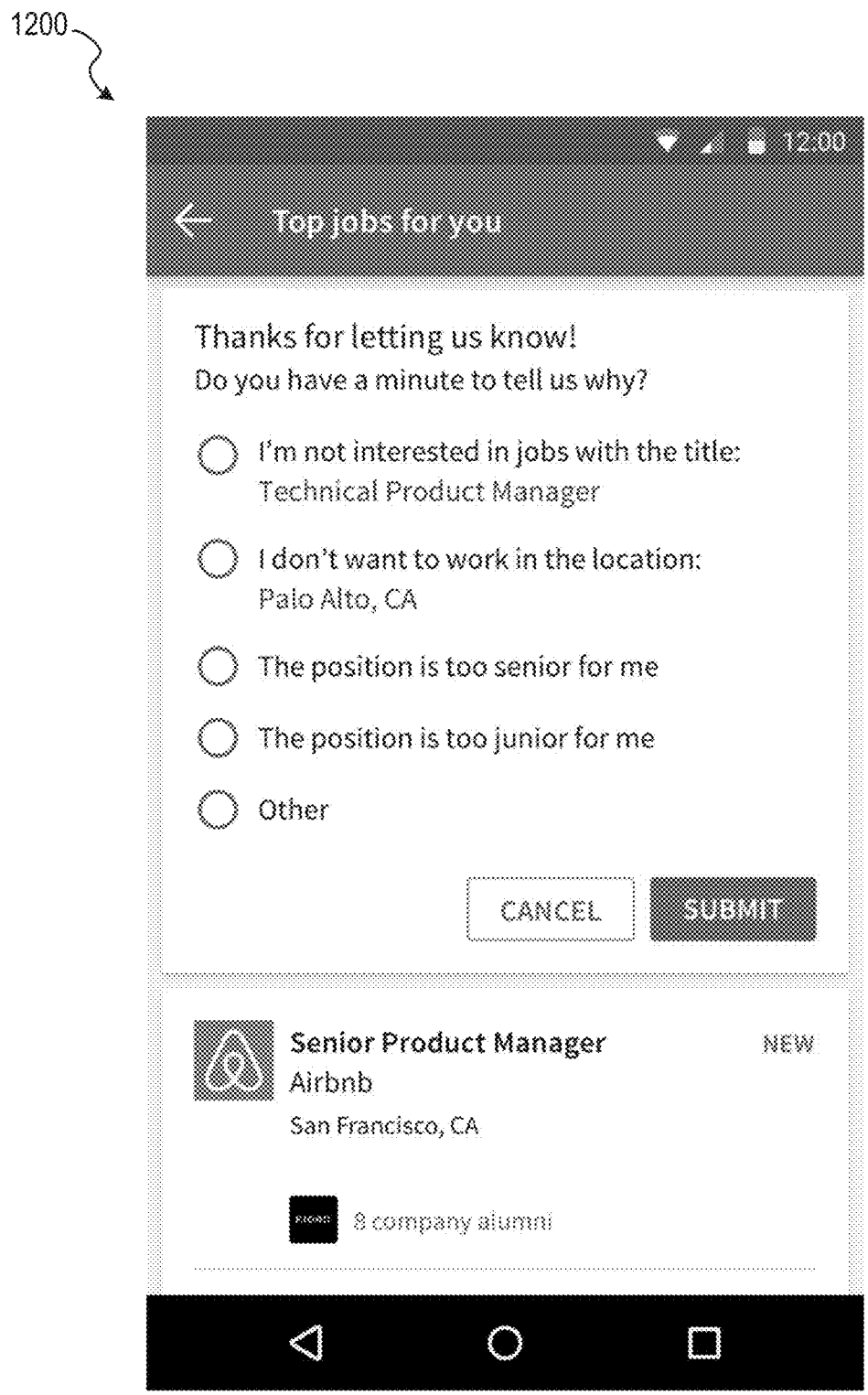
FIG. 12 is a screenshot of an example user interface for prompting the user for reasons why the user provided a negative assessment of the relevancy of one of the identified top jobs for the user.

FIG. 12 is a screenshot of an example user interface 1200 for prompting the user for reasons why the user provided a negative assessment of the relevancy of one of the identified top jobs for the user. For example, the example user interface 1100 may allow the user to select one of a subset of top candidate reasons (e.g., as identified from attributes of the job posting and ranked based on machine-learning of most likely reasons based on past selections of other users). For example, the identified subset of job attributes may include job title, location, seniority too high, or seniority to low. The user may then select and submit one of the identified subset as the reason for dismissing the job from the list of top jobs.

Figure 13:
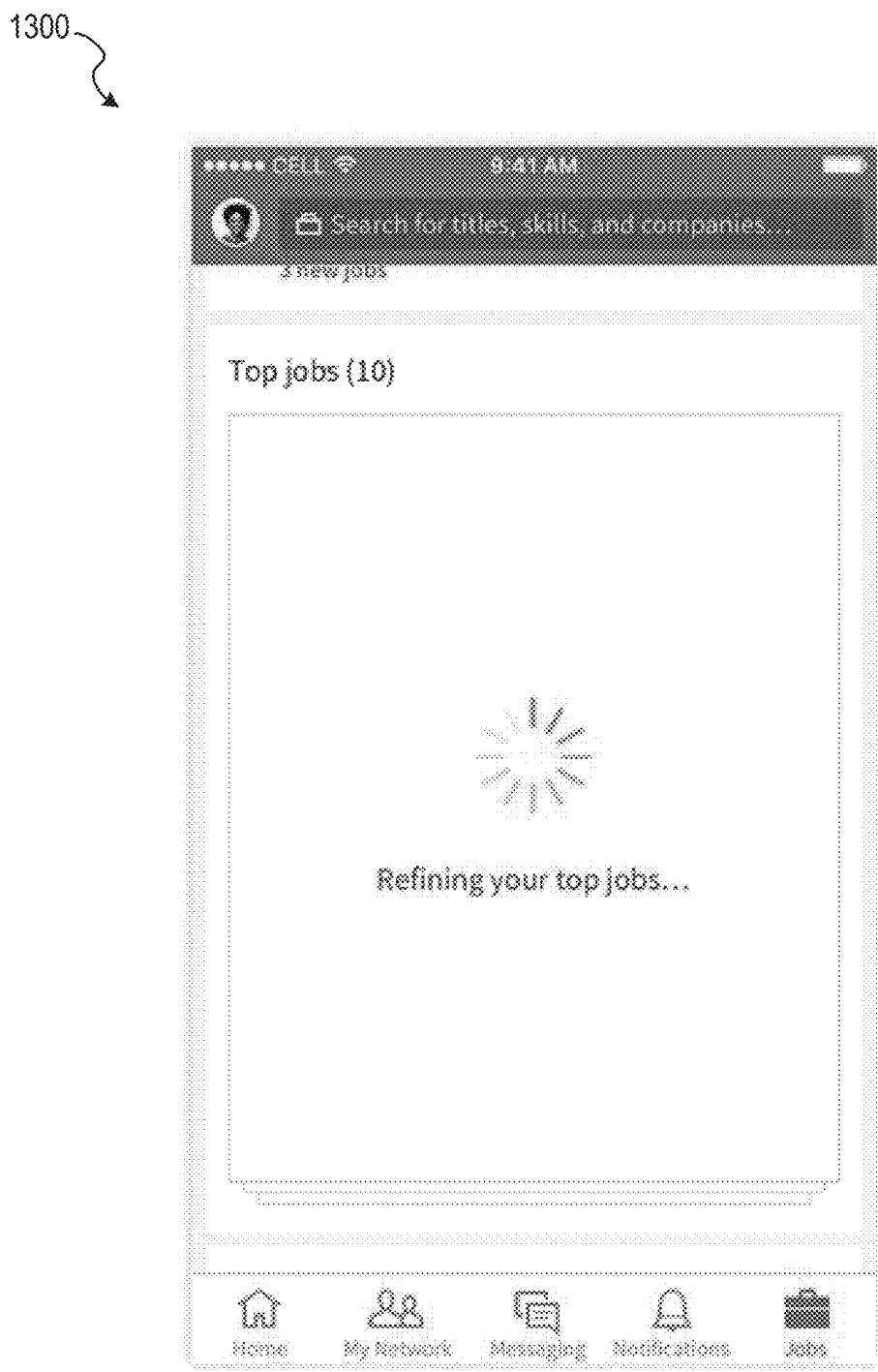
FIG. 13 is a screenshot of an example user interface that includes a notification to the user of the real-time processing of the job relevancy data in response to feedback provided by the user.

FIG. 13 is a screenshot of an example user interface 1300 that includes a notification to the user of the real-time processing of the job relevancy data in response to feedback provided by the user, such as in response to a user selection and submission of one of the subset of top candidate reasons in FIG. 12. In example embodiments, a user interface element, such as a spinning wheel, is presented to the user to indicate that the job relevancy data is being recalculated.

Figure 14:
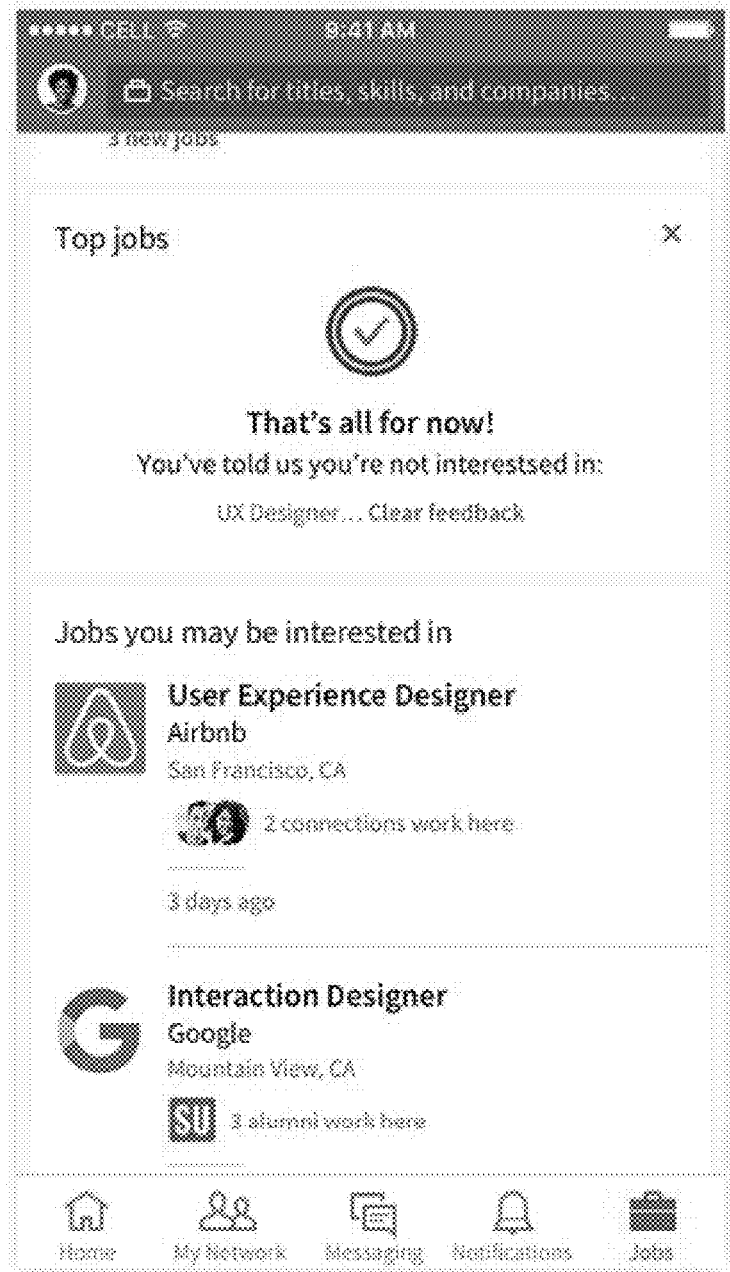
FIG. 14 is a screenshot of an example user interface in which an empty Top Jobs queue is displayed to the user.

FIG. 14 is a screenshot of an example user interface 1400 in which an empty Top Jobs queue is displayed to the user. In this case, either the user has dismissed all of the identified top jobs during the allotted time period or the system has determined that top jobs that were previously remaining in the queue no longer satisfy the top jobs relevancy threshold based on feedback received from the user. In example embodiments, the user interface 1300 may include a user interface element (e.g., "Clear feedback") that allows the user to access a separate portion of the user interface to view or clear feedback items submitted by the user with respect to previously-listed top jobs.

Figure 15:
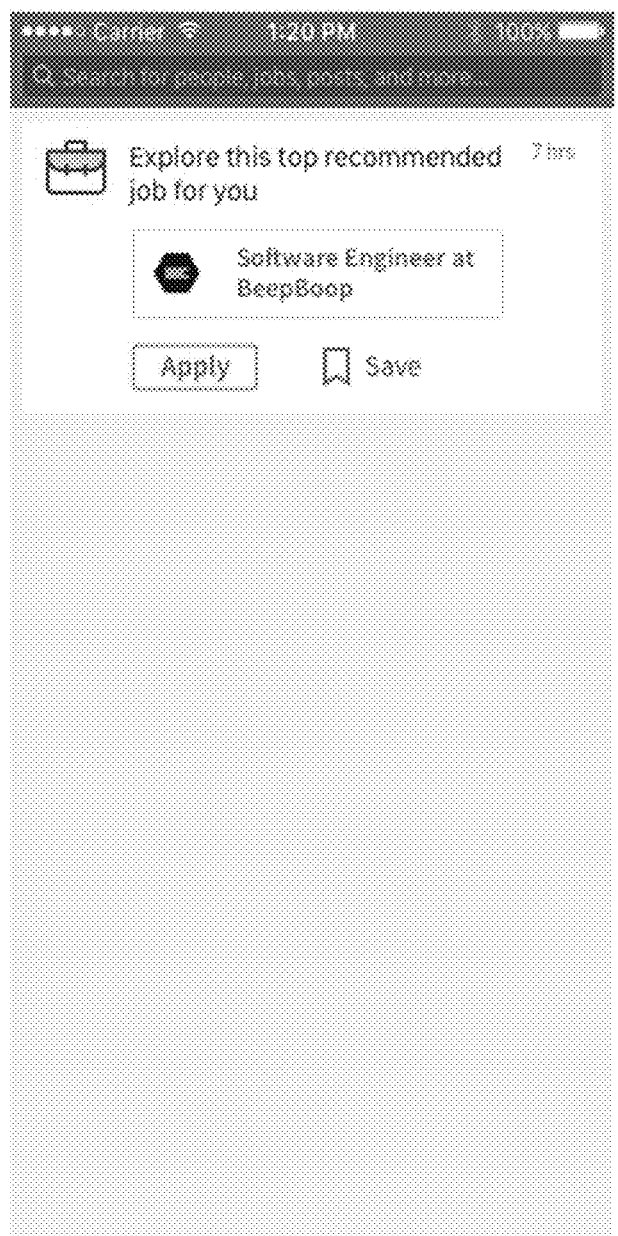
FIG. 15 is a screenshot of an example user interface in which a Breaking Job has been identified and communicated to a member for communication in a user interface.

FIG. 15 is a screenshot of an example user interface 1500 in which a Breaking Job has been identified and communicated to a member for communication in a user interface. In example embodiments, the specialized user interface includes an identification of the title and the company of the job, as well as options to apply or save the job. Although not depicted in FIG. 15, the specialized user interface may also include one or more insights pertaining to the reason why the job was identified for the user as being particularly relevant, as described in more detail above.

Example Mobile Device

Figure 16:
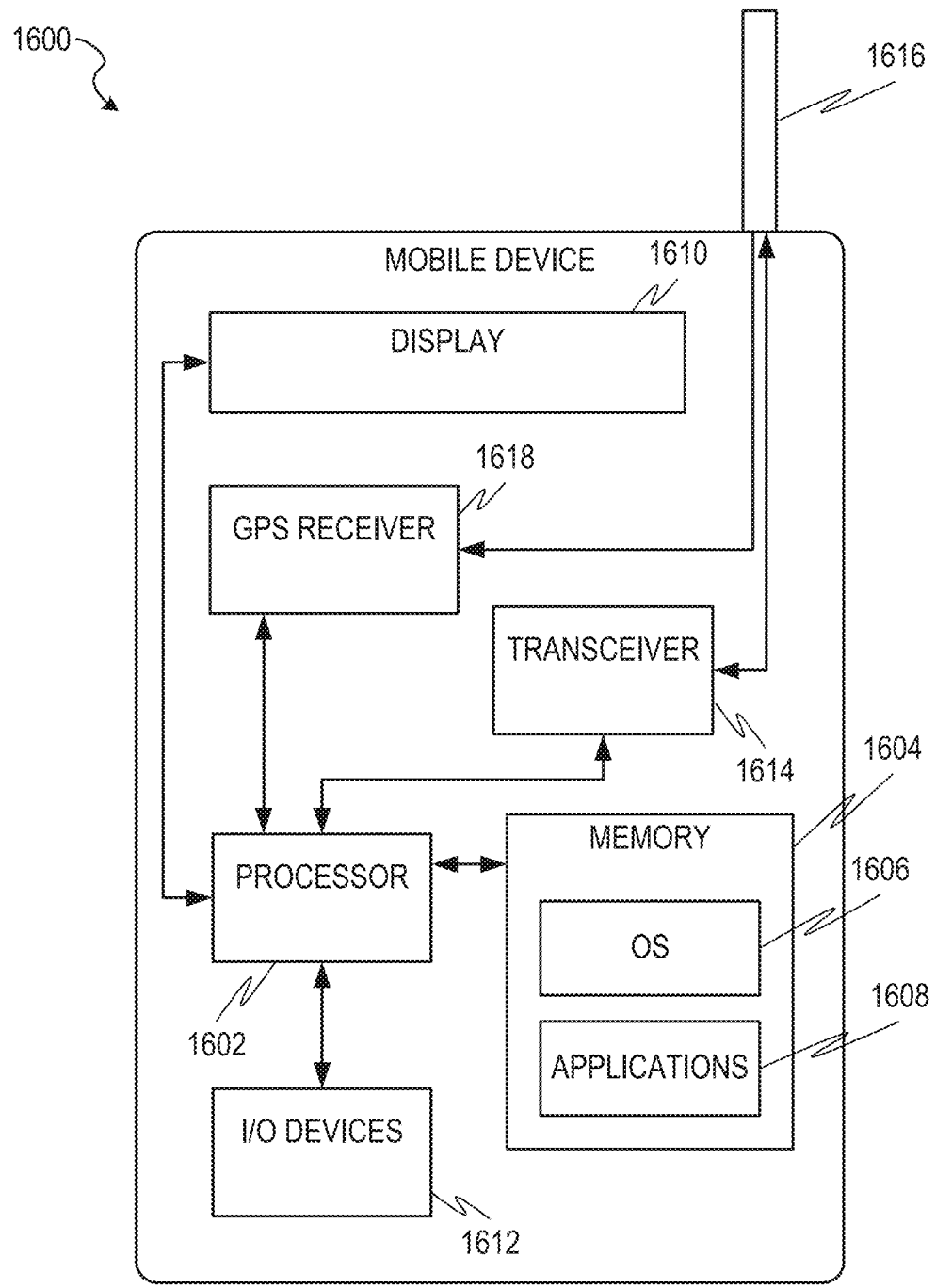
FIG. 16 is a block diagram illustrating a mobile device, in accordance with some example embodiments.

FIG. 16 is a block diagram illustrating a mobile device 1600, according to an example embodiment. The mobile device 1600 can include a processor 1602. The processor 1602 can be any of a variety of different types of commercially available processors suitable for mobile devices 1600 (for example, an XScale architecture microprocessor, a Microprocessor without Interlocked Pipeline Stages (MIPS) architecture processor, or another type of processor). A memory 1604, such as a random access memory (RAM), a Flash memory, or other type of memory, is typically accessible to the processor 1602. The memory 1604 can be adapted to store an operating system (OS) 1606, as well as application programs 1608, such as a mobile location-enabled application that can provide location-based services (LBSs) to a user. The processor 1602 can be coupled, either directly or via appropriate intermediary hardware, to a display 1610 and to one or more input/output (I/O) devices 1612, such as a keypad, a touch panel sensor, a microphone, and the like. Similarly, in some embodiments, the processor 1602 can be coupled to a transceiver 1614 that interfaces with an antenna 1616. The transceiver 1614 can be configured to both transmit and receive cellular network signals, wireless data signals, or other types of signals via the antenna 1616, depending on the nature of the mobile device 1600. Further, in some configurations, a GPS receiver 1618 can also make use of the antenna 1616 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 17:
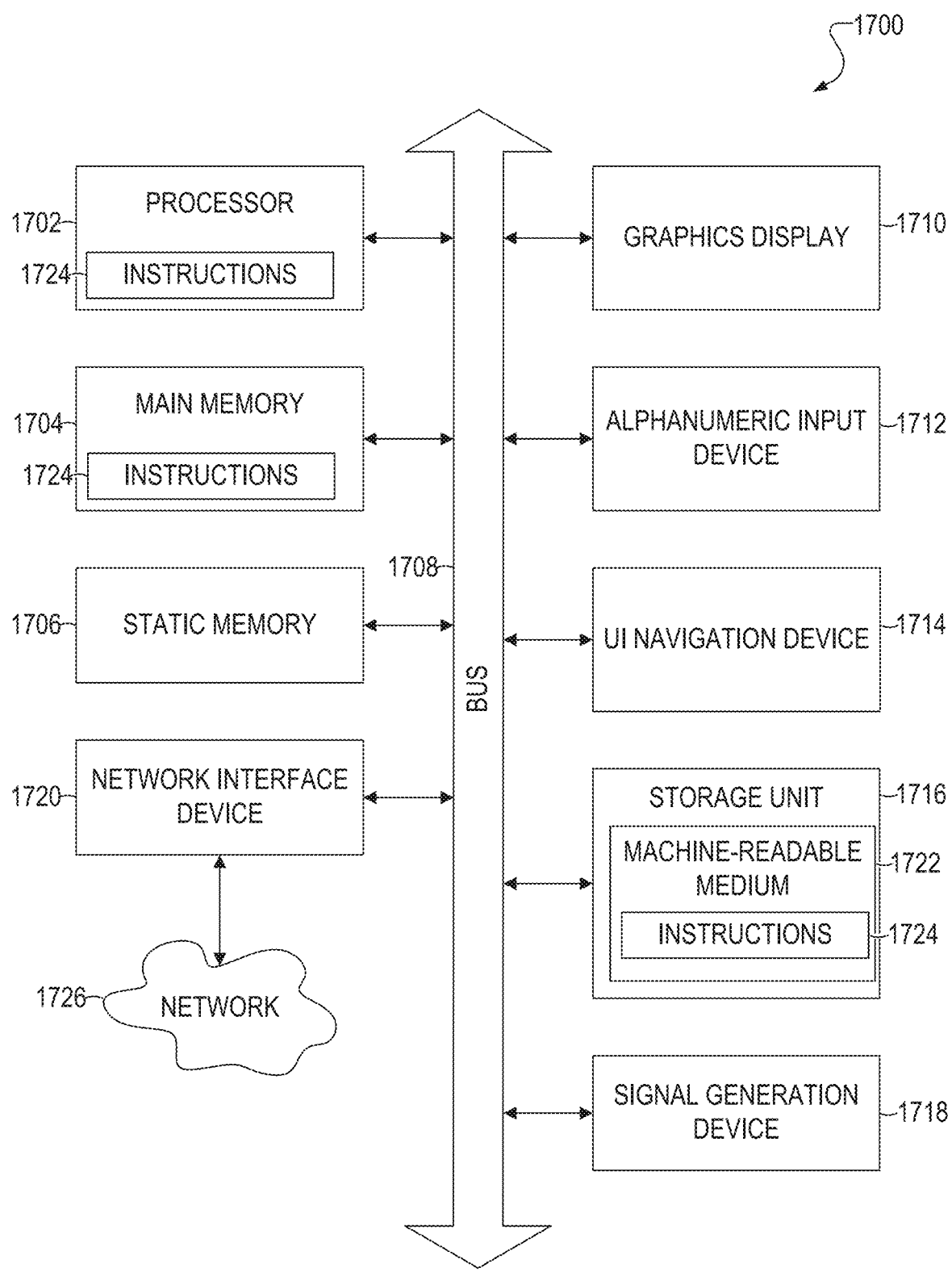
FIG. 17 is a block diagram of an example computer system on which methodologies described herein may be executed, in accordance with an example embodiment.

FIG. 17 is a block diagram of an example computer system 1700 on which methodologies described herein may be executed, in accordance with an example embodiment. In alternative embodiments, the machine operates as a stand-alone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1700 includes a processor 1702 (e.g., a central processing unit (CPU), a graphics processing unit (GPU) or both), a main memory 1704 and a static memory 1706, which communicate with each other via a bus 1708. The computer system 1700 may further include a graphics display unit 1710 (e.g., a liquid crystal display (LCD) or a cathode ray tube (CRT)). The computer system 1700 also includes an alphanumeric input device 1712 (e.g., a keyboard or a touch-sensitive display screen), a user interface (UI) navigation device 1714 (e.g., a mouse), a storage unit 1716, a signal generation device 1718 (e.g., a speaker) and a network interface device 1720.

Machine-Readable Medium

The storage unit 1716 includes a machine-readable medium 1722 on which is stored one or more sets of instructions and data structures (e.g., software) 1724 embodying or utilized by any one or more of the methodologies or functions described herein. The instructions 1724 may also reside, completely or at least partially, within the main memory 1704 and/or within the processor 1702 during execution thereof by the computer system 1700, the main memory 1704 and the processor 1702 also constituting machine-readable media.

While the machine-readable medium 1722 is shown in an example embodiment to be a single medium, the term "machine-readable medium" may include a single medium or multiple media (e.g., a centralized or distributed database, and/or associated caches and servers) that store the one or more instructions 1724 or data structures. The term "machine-readable medium" shall also be taken to include any tangible medium that is capable of storing, encoding or carrying instructions (e.g., instructions 1724) for execution by the machine and that cause the machine to perform any one or more of the methodologies of the present disclosure, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 1724 may further be transmitted or received over a communications network 1726 using a transmission medium. The instructions 1724 may be transmitted using the network interface device 1720 and any one of a number of well-known transfer protocols (e.g., HTTP). Examples of communication networks include a local area network ("LAN"), a wide area network ("WAN"), the Internet, mobile telephone networks, Plain Old Telephone Service (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled. Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system comprising:
one or more computer processors; and
a non-transitory computer-readable medium storing instructions that, when executed by the one or more computer processors, cause the one or more computer processors to perform operations comprising:
generating a first query for job listings stored in a first database for a member of a social networking system (SNS), the first query generated using a back-end model query configuration;
retrieving a plurality of job listings in the first database based on the first query;
causing display of a list of one or more of the retrieved plurality of job listings in a dynamic user interface of a device of the user, the dynamic user interface allowing the member to browse through the job listings and dismiss one or more of the job listings based on the first attribute, the one or more displayed job listings having one or more attributes and one or more weightings associated with the one or more attributes;
aggregating a number of dismissals of the job listings based on the first attribute;
based on the aggregated number of dismissals, generating a modified relevancy assessment of one or more of the plurality of job listings, the modified relevancy assessment including modifying weightings associated with one or more attributes of job listings having an attribute matching the first attribute while leaving weightings associated with one or more attributes of job listings not having an attribute matching the first attribute unchanged, the modifying applying an exponential decay-based weight to the weightings associated with one or more attributes of job listings having an attribute matching the first attribute; and
applying the modified relevancy assessment in real time to the plurality of job listings, the applying of the modified relevancy assessment including performing the weighted function by multiplying the weightings by one or more values of corresponding attributes specified within the plurality of job listings and updating the dynamic user interface of the device, the updating including causing display of a modified list of job listings for the member and a selectable user interface element in the dynamic user interface of the device, a selection of the selectable user interface element causing generating a request to apply for a job associated with a listing included in the modified list via the dynamic user interface of the device.

2. The system of claim 1, wherein the exponential decay-based weight reduces the weightings less as time passes.

3. The system of claim 2, wherein the list is based on an initial relevancy threshold value that is determined based on a liquidity of the top jobs transgressing a minimum liquidity amount over a time period for the member.

4. The system of claim 2, wherein the initial relevancy threshold value is based on a positive/negative feedback ratio.

5. The system of claim 1, wherein the dismissals of the job listings based on the first attribute is one of a plurality of reasons selected and presented in the user interfaced in order of ranking based on previously-selected reasons presented in other user interfaces to other members of the SNS.

6. The system of claim 1, wherein the operations further comprise:
comparing a number of times a job listing with a particular value for a particular attribute has been provided by an indication of low relevancy by a member to a preset threshold; and
in response to a determination that the number of times a job listing with the particular value for the particular attribute has been provided with an indication of low relevancy by the member transgresses the preset threshold, modifying the back-end model query configuration to include a negation clause preventing future queries generated using the back-end model query configuration for the member from returning results having the particular value for the particular attribute.

7. The system of claim 6, wherein the back-end model query configuration is modified based on a query-profile similarity measure indicating how similar a query is to attributes of a profile of the member.

8. A method comprising:
generating a first query for job listings stored in a first database for a member of a social networking system (SNS), the first query generated using a back-end model query configuration;
retrieving a plurality of job listings in the first database based on the first query;
causing display of a list of one or more of the retrieved plurality of job listings in a dynamic user interface of a device of the user, the dynamic user interface allowing the member to browse through the job listings and dismiss one or more of the job listings based on the first attribute, the one or more displayed job listings having one or more attributes and one or more weightings associated with the one or more attributes;
aggregating a number of dismissals of the job listings based on the first attribute;
based on the aggregated number of dismissals, generating a modified relevancy assessment of one or more of the plurality of job listings, the modified relevancy assessment including modifying weightings associated with one or more attributes of job listings having an attribute matching the first attribute while leaving weightings associated with one or more attributes of job listings not having an attribute matching the first attribute unchanged, the modifying applying an exponential decay-based weight to the weightings associated with one or more attributes of job listings having an attribute matching the first attribute; and
applying the modified relevancy assessment in real time to the plurality of job listings, the applying of the modified relevancy assessment including performing the weighted function by multiplying the weightings by one or more values of corresponding attributes specified within the plurality of job listings and updating the dynamic user interface of the device, the updating including causing display of a modified list of job listings for the member and a selectable user interface element in the dynamic user interface of the device, a selection of the selectable user interface element causing generating a request to apply for a job associated with a listing included in the modified list via the dynamic user interface of the device.

9. The method of claim 8, wherein the exponential decay-based weight reduces the weightings less as time passes.

10. The method of claim 9, wherein the list is based on an initial relevancy threshold value that is determined based on a liquidity of the top jobs transgressing a minimum liquidity amount over a time period for the member.

11. The method of claim 9, wherein the initial relevancy threshold value is based on a positive/negative feedback ratio.

12. The method of claim 8, wherein the indication of relevancy is one of a plurality of reasons selected and presented in the user interfaced in order of ranking based on previously-selected reasons presented in other user interfaces to other members of the SNS.

13. The method of claim 8, wherein the operations further comprise:
    comparing a number of times a job listing with a particular value for a particular attribute has been provided by an indication of low relevancy by a member to a preset threshold; and
    in response to a determination that the number of times a job listing with the particular value for the particular attribute has been provided with an indication of low relevancy by the member transgresses the preset threshold, modifying the back-end model query configuration to include a negation clause preventing future queries generated using the back-end model query configuration for the member from returning results having the particular value for the particular attribute.

14. The method of claim 13, wherein the back-end model query configuration is modified based on a query-profile similarity measure indicating how similar a query is to attributes of a profile of the member.

15. A system comprising:
    means for generating a first query for job listings stored in a first database for a member of a social networking system (SNS), the first query generated using a back-end model query configuration;
    means for retrieving a plurality of job listings in the first database based on the first query;
    means for causing display of a list of one or more of the retrieved plurality of job listings in a dynamic user interface of a device of the user, the dynamic user interface allowing the member to browse through the job listings and dismiss one or more of the job listings based on the first attribute, the one or more displayed job listings having one or more attributes and one or more weightings associated with the one or more attributes;
    means for aggregating a number of dismissals of the job listings based on the first attribute;
    means for based on the aggregated number of dismissals, generating a modified relevancy assessment of one or more of the plurality of job listings, the modified relevancy assessment including modifying weightings associated with one or more attributes of job listings having an attribute matching the first attribute while leaving weightings associated with one or more attributes of job listings not having an attribute matching the first attribute unchanged, the modifying applying an exponential decay-based weight to the weightings associated with one or more attributes of job listings having an attribute matching the first attribute; and
    means for applying the modified relevancy assessment in real time to the plurality of job listings, the applying of the modified relevancy assessment including performing the weighted function by multiplying the weightings by one or more values of corresponding attributes specified within the plurality of job listings and updating the dynamic user interface of the device, the updating including causing display of a modified list of job listings for the member and a selectable user interface element in the dynamic user interface of the device, a selection of the selectable user interface element causing generating a request to apply for a job associated with a listing included in the modified list via the dynamic user interface of the device.

16. The system of claim 15, wherein the exponential decay-based weight reduces the weightings less as time passes.

17. The system of claim 16, wherein the list is based on an initial relevancy threshold value that is determined based on a liquidity of the top jobs transgressing a minimum liquidity amount over a time period for the member.

18. The system of claim 16, wherein the initial relevancy threshold value is based on a positive/negative feedback ratio.

19. The system of claim 15, wherein the indication of relevancy is one of a plurality of reasons selected and presented in the user interfaced in order of ranking based on previously-selected reasons presented in other user interfaces to other members of the SNS.

20. The system of claim 15, further comprising:
    means for comparing a number of times a job listing with a particular value for a particular attribute has been provided by an indication of low relevancy by a member to a preset threshold; and
    means for, in response to a determination that the number of times a job listing with the particular value for the particular attribute has been provided with an indication of low relevancy by the member transgresses the preset threshold, modifying the back-end model query configuration to include a negation clause preventing future queries generated using the back-end model query configuration for the member from returning results having the particular value for the particular attribute.

* * * * *